US010040957B2

(12) United States Patent
Brust et al.

(10) Patent No.: US 10,040,957 B2
(45) Date of Patent: *Aug. 7, 2018

(54) INK JETTABLE, UV-CURABLE COMPOSITIONS

(71) Applicant: Eastman Kodak Company, Rochester, NY (US)

(72) Inventors: Thomas B. Brust, Webster, NY (US); Anne Troxell Wyand, Victor, NY (US); Grace Ann Bennett, Scottsville, NY (US); Catherine A. Falkner, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/856,630

(22) Filed: Sep. 17, 2015

(65) Prior Publication Data

US 2017/0081532 A1    Mar. 23, 2017

(51) Int. Cl.
| | |
|---|---|
| *C09D 11/101* | (2014.01) |
| *C09D 11/30* | (2014.01) |
| *C09D 125/04* | (2006.01) |
| *C09D 133/02* | (2006.01) |
| *C09D 133/14* | (2006.01) |
| *C09D 133/26* | (2006.01) |
| *C09D 11/00* | (2014.01) |
| *C09D 11/10* | (2014.01) |
| *C09D 11/102* | (2014.01) |

(52) U.S. Cl.
CPC .......... *C09D 11/101* (2013.01); *C09D 11/00* (2013.01); *C09D 11/10* (2013.01); *C09D 11/102* (2013.01); *C09D 11/30* (2013.01); *C09D 125/04* (2013.01); *C09D 133/02* (2013.01); *C09D 133/14* (2013.01); *C09D 133/26* (2013.01)

(58) Field of Classification Search
CPC .... C09D 11/101; C09D 11/30; C09D 125/04; C09D 133/02; C09D 11/102; C09D 11/00; C09D 11/10; C09D 133/14; C09D 133/26

See application file for complete search history.

(56) References Cited

U.S. PATENT DOCUMENTS

| | | | |
|---|---|---|---|
| 6,846,851 B2 | 1/2005 | Nakhmanovich et al. | |
| 6,939,568 B2* | 9/2005 | Burrell ................ | A01N 59/16 424/400 |
| 7,275,818 B2 | 10/2007 | Figov et al. | |
| 7,348,365 B2 | 3/2008 | Lee et al. | |
| 7,763,668 B2 | 7/2010 | Trueba et al. | |
| 8,361,553 B2 | 1/2013 | Karandikar et al. | |
| 8,828,275 B2 | 9/2014 | Wang et al. | |
| 9,069,248 B1 | 6/2015 | Brust et al. | |
| 2002/0198289 A1 | 12/2002 | Gummeson | |
| 2008/0147019 A1* | 6/2008 | Song ................ | C08B 37/003 604/265 |
| 2009/0233014 A1 | 9/2009 | Stumpe et al. | |
| 2009/0263496 A1 | 10/2009 | Kijlstra et al. | |
| 2014/0204161 A1 | 7/2014 | Belelie et al. | |

OTHER PUBLICATIONS

Szczubialka et al. "Response of micelles formed by smart terpolymers to stimuli studied by dynamic light scattering," vol. 44, issue 18, (Aug. 2003) p. 5269-5274.*
Andrew Hancock and Long Lin, "Challenges of UV curable ink-jet printing inks—a formulator's perspective," Pigment & Resin Technology, Oct. 1, 2004, 33 (5) pp. 280-286.

* cited by examiner

*Primary Examiner* — Michael F Pepitone
*Assistant Examiner* — Jessica M Roswell
(74) *Attorney, Agent, or Firm* — J. Lanny Tucker

(57) ABSTRACT

Ink jettable and UV-curable compositions include a reactive polymer comprising: (a1) at least 20 mol % of recurring units comprising pendant metal complexing water-solubilizing groups, and (b) at least 5 mol % of recurring units comprising a pendant group capable of crosslinking via [2+2] photocycloaddition. The compositions can optionally have a humectant, a dye or pigment colorant, an anionic or nonionic surfactant, a water-soluble or water-dispersible acrylic polymer, or a water-soluble or water-dispersible polyurethane. Such ink jettable and UV-curable compositions can include a complex of reducible metal ions or metal nanoparticles with the reactive polymer.

19 Claims, No Drawings

US 10,040,957 B2

INK JETTABLE, UV-CURABLE COMPOSITIONS

RELATED APPLICATIONS

Related subject matter is described and claimed in the following copending and commonly assigned patent applications:

U.S. Ser. No. 14/856,658, filed on Sep. 17, 2015, by Brust and Wyand and entitled "Articles Prepared Using Ink Jettable, UV-Curable Compositions";

U.S. Ser. No. 14/856,685, filed on Sep. 17, 2015, by Brust and Wyand and entitled "Methods for Using Ink Jettable, UV-Curable Compositions";

U.S. Ser. No. 14/661,235 filed Mar. 18, 2015 by Brust, Bennett, and Falkner;

U.S. Ser. No. 14/661,278 filed Mar. 18, 2015 by Brust and Wyand; and

U.S. Ser. No. 14/661,327 filed Mar. 18, 2015 by Brust and Wyand.

FIELD OF THE INVENTION

This invention relates to ink jettable and UV-curable compositions that can be used to provide ink jet images forming various patterns, articles, and methods. Such compositions include unique reactive polymers that comprise pendant crosslinkable groups as well as pendant hydrophilic groups.

BACKGROUND OF THE INVENTION

While inkjet printing methods are well known for printing text and images meant for viewing by the human visual system, the ability of inkjet methods to produce patterns of functional fluids on a variety of substrates affords the possibility of expanding the use of inkjet methods into the creation of functional patterns such as electrical circuits, sensors, or even antimicrobial coatings. However, the use of inkjet methods for functional patterning presents a number of challenges related to the limitations of the ink jet printing hardware and the unique requirements needed for ejecting inks. For example, most inkjet printing methods are limited to a single drop size of greater than about 10 μm, and more typically of from 20 μm to 50 μm, thus limiting the linewidth of a functional pattern to at least those dimensions or greater to achieve robust performance. A variety of circuitry can be designed with large macroscopic linewidths that are well suited to inkjet printing and various methods of patterning could be combined to cover a wide range of linewidths.

Each type of ink jet ejection method places specific demands or limitations on the ink jet ink composition that can greatly limit the choice of materials used to formulate the ink jet ink composition. Continuous ink jetting requires the ink jet ink composition to be pumped at high pressure through a recirculation system that can include the use of high shear pumping and filtration that can damage or destabilize dispersions of polymers, pigments, or other functional materials such as metal nano-particles. Piezoelectric drop-on-demand (DOD) print heads are often the most tolerant of a wide range of ink jet ink composition formulations including non-aqueous, high viscosity, and even heat-curable formulations. Unfortunately, they tend to be expensive to manufacture and suffer from slower ink jet ejection rates. Thermal DOD print heads are relatively inexpensive to manufacture, offer a wide range of designs, and can be fired at ejection rates in excess of 30 kHz, thus allowing the highest print speed for DOD printing. They also require the ink jet ink composition to come into contact with a resistive heater that vaporizes enough ink jet ink composition to form a vapor bubble capable of ejecting the remaining ink jet ink composition in the chamber out through the nozzles such that the ejected drop typically has a velocity of about 10 m/sec or greater. The resistive heating element typically reaches temperature of about 300° C. that can decompose or destabilize the ink jet ink composition and cause kogation (build-up of decomposition products on the heater surface or in the ink chamber) and eventual nozzle clogging or heater failure.

The need for efficient energy transfer from the resistive heater to the ejected drop also favors aqueous-based inks due to the high vaporization energy of water, although non-aqueous thermal inks are known but rarely used. All DOD ejection systems will tend to form a very fine mist due to the formation of unwanted satellite drops. The use of organic solvents in ink jet ink compositions can create a serious health and safety hazard due to this fine mist formation.

Ink jet ink compositions used for functional printing (that may include electroless metal plating) will often be designed to adhere to flexible substrates such as polyesters like polyethylene terephthalate (PET) with good adhesion and durability. Ink jet ink compositions that can be hardened or cured using heat or radiation are well known and widely used for this purpose. They are often generically referred to as "UV-curable inks." Such inks are typically formulated with vinyl monomers or oligomers that contain one or more pendant vinyl groups that can polymerize and form a cross-linked network. The polymerization or crosslinking is most often initiated by free radicals formed from an added initiator compound that decomposes into active radicals upon exposure to appropriate wavelength UV-radiation or heat. UV curing may occur almost simultaneously with the printing, or it can be delayed. UV-curable inks are most commonly organic solvent-based and are ink jet printed with piezo print heads to avoid the need for vaporization and the possibility of premature polymerization in the print head from thermal initiation by the high temperatures of the resistive heater of a thermal print head. Some aqueous ink jet ink compositions have been reported and contain water-soluble cross-linkable oligomers and free radical initiators such as those commercially available as Sartomer® SR415 and Irgacure® 2959.

UV-curable ink jet ink compositions formulated with multi-functional vinyl or acrylate monomers and UV-activated free radical initiators have several drawbacks, especially if they are ejected with a thermal printhead. The radical initiators, while triggered by UV light at temperatures typically below 100° C., will thermally decompose to form radicals at higher temperatures such as those near the 300° C. resistive heater in a thermal ejector chamber. This can cause premature polymerization in the nozzle or ink-feed plenum resulting in ejector plugging or failure and poor reliability. Secondly, the organic solvents and the vinyl monomers contained in the non-cured ink are flammable and often unsafe for human exposure, especially as an extremely fine mist that often accompanies most DOD printing. While some aqueous formulations are possible, the formulation options are limited due to limited solubility of the components and even aqueous-based formulations can still be hazardous because of the presence of acrylate monomers or oligomers known to cause toxic sensitization reactions on exposure.

Ink jet ink compositions useful for functional patterning to form catalytic patterns useful for further chemical processes such as electroless metal plating or sensor formation should be insoluble in aqueous solutions that are often strongly basic solutions after ink jet printing, but they should remain permeable to water and other aqueous reactants such as metal ions or complexes and reducing agents.

Thus, a unique type of UV-curable polymer is needed to avoid all of these problems. Such UV-curable polymers should be very water-soluble before crosslinking, but should become water-insoluble but still aqueous permeable after crosslinking and after the ink jet ink compositions are printed. The UV-curable polymers should also have the capability to complex metal ions and possibly stabilize the formation of metal nanoparticles by containing an adequate level of metal complexing functionality such as carboxylic or carboxylate groups, sulfonic acid or sulfonate groups, phosphonic acid or phosphonate groups, and possibly other functionality such as amide, alcohol, and amine groups. The crosslinking functionality of these polymers should also be stable to the thermal ejection process during ink jet printing and have typical long-term storage properties.

Aqueous UV-curable ink jet ink compositions that contain a multi-functional water-soluble acrylate monomers with free radical photoinitiators have been reported in U.S. Pat. No. 6,846,851 (Nakhmanovich et al.) and U.S. Patent Application Publication 2002/0198289 (Gummeson). This type of chemistry is also well known for the preparation of hydrogels and interpenetrating networks that can be used to complex and form stable metal nanoparticles. Unfortunately, these types of ink jet ink compositions will likely exhibit the drawbacks described above for UV-curable inks, especially when used for thermal print head ejection.

Thus, there is a need to address these problems with improved UV-curable ink jet ink compositions.

SUMMARY OF THE INVENTION

The present invention provides an ink jettable and UV-curable composition comprising:

a reactive polymer comprising: (a1) at least 20 mol % of recurring units comprising pendant metal complexing water-solubilizing groups, (b) at least 5 mol % of recurring units comprising a pendant group capable of crosslinking via [2+2] photocycloaddition, and optionally (c) at least 1 mol % of recurring units comprising a pendant amide, hydroxyl, or lactam group, or a pendant precursor moiety for the pendant amide, hydroxyl, or lactam group, all amounts based on the total recurring units in the reactive polymer; and optionally, one or more of the following components:
a humectant,
a dye or pigment colorant,
an anionic or nonionic surfactant,
a water-soluble or water-dispersible acrylic polymer, and
a water-soluble or water-dispersible polyurethane.

In addition, the present invention further provides an ink jettable and UV-curable composition comprising:

a complex of reducible metal ions or metal nanoparticles with a reactive polymer, the reactive polymer comprising: (a2) at least 5 mol % of recurring units comprising pendant sulfonate groups, (b) at least 5 mol % of recurring units comprising a pendant group capable of crosslinking via [2+2] photocycloaddition, and optionally (c) at least 1 mol % of recurring units comprising a pendant amide, hydroxyl, lactam group, carboxylic acid, phosphonic acid group or a pendant precursor moiety for the pendant amide, hydroxyl, lactam, carboxylic acid, or phosphonic acid group, all amounts based on the total recurring units in the reactive polymer; and optionally, one or more of the following components:
a humectant,
a dye or pigment colorant,
an anionic or nonionic surfactant,
a water-soluble or water-dispersible acrylic polymer, and
a water-soluble or water-dispersible polyurethane.

An ink jettable and UV-curable composition is provided by the present invention, which composition comprises a water soluble, metal complexing polymer that can be crosslinked or cured by exposure to UV-radiation through a [2+2] photocycloadditon process that does not require a free radical initiator and is insensitive to thermal initiation during ink jet printing, making it well-suited for ejection using a thermal print head. The ink jettable and UV-curable composition of this invention optionally contains one or more aqueous compatible humectants or surfactants to improve ink jet drop formation and ejection reliability. The composition can also optionally contain additional water-soluble or water-dispersible polymers such as an anionic polyurethane or anionic styrene-acrylic copolymer that can further improve jetting performance and durability of the ink jet printed image.

The, the advantages from the present invention are provided using a unique reactive polymer that is water-soluble or water-dispersible and can be used to form a complex with either reducible metal ions (for example, reducible silver ions) or metal nanoparticles (for example, silver nanoparticles). Two essential features are present in the reactive polymer to provide the desired properties. The first essential feature for some embodiments of the present invention is the presence of greater than about 5 mol % of (a2) recurring units comprising sulfonic acid or sulfonate groups. The second essential feature is the presence of at least 5 mol % of (b) recurring units comprising a pendant group capable of crosslinking via [2+2] photocycloaddition group. A variety of other recurring units can be present in the reactive polymer, for example comprising pendant amide, hydroxyl, lactam, phosphonic acid, or carboxylic acid groups to provide additional properties. Hydrophobic ethylenically unsaturated polymerizable monomers such as styrene or acrylate esters can also be used in the polymerization processes to provide polymers with enhanced film forming and durability.

The presence of the sulfonic acid or sulfonate groups in the reactive polymers provides desired water solubility or water dispersibility for a broad range of uses, most importantly in the presence of reducible metal ions that can precipitate other less water-soluble polymers. The pendant groups that are capable of [2+2] photocycloaddition provide a built-in crosslinking function that is only activated by exposure to the appropriate UV radiation and is extremely thermally stable.

In other embodiments, the reactive polymers can comprise at least 40 mol % of the (a1) recurring units described herein that comprise pendant metal complexing water-solubilizing groups along with the (b) recurring units described herein.

The reducible metal ion or metal nanoparticle bearing polymeric complexes used in this invention have a broad range of capabilities or uses due to the reactivity of the complexed reducible metal ions or metal nanoparticles, high resolution patternability, and water-solubility or swellability after reactive polymer crosslinking. These reducible metal ion or metal nanoparticle containing polymer complexes can be ink jetted to form various ink jet printed images as well as high resolution, electrically-conductive metal grid patterns because the metal nanoparticles can act as seed catalysts for electroless metal plating. For example, these complexes can be ink jet printed and exposed with a high resolution UV radiation and developed in water before any further process such as electroless metal plating is carried out.

These polymeric complexes containing reducible metal ions or metal nanoparticles can also be ink jet printed onto various surfaces (for example, surfaces of various substrates described below) where they can be hardened by UV-curing exposure or patterned with UV radiation to form metal ion loaded crosslinked hydrogels (containing reacted polymers) wherein water and ions can readily diffuse in and out.

The reducible metal ion or metal nanoparticle containing ink jettable and UV-curable compositions described herein provide the opportunity to combine both the inherent antimicrobial activity of certain metals (such as silver and copper) with the advantages of the noted essential reactive polymer features so that pattern formation is also enhanced, further improving the inhibition of microbial colonization and growth.

In addition, the UV radiation patternability and water-solubility of the noted metal ion or metal nanoparticle containing ink jettable and UV-curable compositions facilitate patterning in a roll-to-roll manufacturing system using simple water-bath processing at various stages.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described in the discussion of any embodiment.

Definitions

As used herein to define various components of the ink jettable and UV-curable compositions, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the term "weight %" refers to the amount of a component or material based on the total solids of a composition, formulation, or layer. Unless otherwise indicated, the percentages can be the same for either a dry layer or pattern, or for the total solids of the formulation or composition.

The term "homopolymer" is meant to refer to polymeric materials that have the same repeating or recurring unit along a polymer backbone. The term "copolymer" refers to polymeric materials composed of two or more different repeating or recurring units that are arranged in any order (randomly or otherwise) along the reactive polymer backbone.

For the reactive polymers used in the present invention, the recurring units can be arranged randomly along the reactive polymer backbone, or there can be blocks of recurring units that occur naturally during the polymerization process.

Recurring units in the reactive polymers described herein can be generally derived from the corresponding ethylenically unsaturated polymerizable monomers used in a polymerization process, which ethylenically unsaturated polymerizable monomers have the desired functional and pendant groups. Alternatively, desired pendant groups can be incorporated within recurring units after polymerization of ethylenically unsaturated polymerizable monomers by reaction with requisite precursor pendant groups.

The term "polymerization" is used herein to mean the combining, for example by covalent bonding, of a large number of smaller molecules, such as monomers, to form very large molecules, that is, macromolecules or polymers. The monomers can be combined to form only linear macromolecules or they can be combined to form three-dimensional macromolecules that are commonly referred to as crosslinked polymers. One type of polymerization that can be carried out in the practice of this invention is free radical polymerization when free radical reactive ethylenically unsaturated polymerizable monomers and suitable free radical generating initiators are present.

The term "reactive polymer" is used herein to refer to the copolymers described below that have the described essential components and properties and can be used in the compositions, articles, and methods described herein, and which copolymers are sensitive to ultraviolet radiation so that crosslinking occurs using the pendant groups in the (a1) and (a2) recurring units noted below.

In reference to reactive polymers described herein, the term "water-soluble" is used to mean that the minimum solubility in water of a given reactive polymer is at least 0.1 weight % at 25° C. Some reactive polymers can be less water-solubility but still water-dispersible. The term "water-insoluble" is used to mean that a given reactive polymer is less than less than 0.1 weight % at 25° C.

The term "crosslinked reacted polymer" is used herein to refer to the crosslinked form of the corresponding reactive polymer.

The term "aqueous-based" refers to solutions, baths, or dispersions in which the predominant solvent, or at least 50 weight % of the solvents, is water.

Unless otherwise indicated, the term "mol %" when used in reference to recurring units in reactive polymers, refers to either the nominal (theoretical) amount of a recurring unit based on the molecular weight of ethylenically unsaturated polymerizable monomer used in the polymerization process or to the actual amount of recurring unit in the resulting reactive polymer as determined using suitable analytical techniques and equipment.

Unless otherwise indicated, the term "group" particularly when used to define a substituent of a defined moiety, can itself be substituted or unsubstituted (for example and alkyl group" refers to a substituted or unsubstituted alkyl). Generally, unless otherwise specifically stated, substituents on any "groups" referenced herein or where something is stated to be possibly substituted, include the possibility of any groups, whether substituted or unsubstituted, which do not destroy properties necessary for the utility of the component or aqueous metal catalytic composition. It will also be understood for this application that reference to a compound of a particular general structure includes those compounds of other more specific formula that fall within the general structural definition. Examples of substituents on any of the mentioned groups can include known substituents such as: halogen (for example, chloro, fluoro, bromo, and iodo); nitro; cyano; amino; alkoxy particularly those with 1 to 12 carbon atoms (for example, methoxy and ethoxy); substituted or unsubstituted alkyl groups, particularly lower alkyl groups (for example, methyl and trifluoromethyl); alkenyl or thioalkyl (for example, methylthio and ethylthio), particularly either of those with 1 to 12 carbon atoms; substituted and unsubstituted aryl, particularly those having from 6 to 20 carbon atoms in the aromatic ring (for example, phenyl); and substituted or unsubstituted heteroaryl, particularly those having a 5- or 6-membered ring containing 1 to 3 heteroatoms selected from N, O, S or Se (for example, pyridyl, thienyl, furyl, pyrrolyl, and their corresponding benzo and naptho analogs); and other substituents that would be readily apparent in the art. Alkyl substituents particularly contain 1 to 12 carbon atoms and specifically include "lower alkyl" that is having from 1 to 6 carbon atoms, for example, methyl, ethyl, and t-butyl. Further, with regard to any alkyl group, alkylene group or alkenyl group, it will be understood that these can be branched or unbranched and include ring (cyclic) structures.

The term "UV radiation" is used herein to refer to electromagnetic radiation having a wavelength ($\lambda_{max}$) of at least 150 nm and up to and including 450 nm.

As used herein, all molecular weights are weight average molecular weights ($M_w$) that can be determined using known procedures and equipment if the values are not already known from the literature. For example, $M_w$ can be determined using Size Exclusion Chromatography (SEC) and values are reported herein as poly(methyl methacrylate) equivalent weights.

In defining various dimensions of features and nanoparticles, each dimension "average" is determined from at least 2 measurements of the specific dimension using appropriate measurement techniques and equipment that would be known to one skilled in the art. For example, the average dry thickness of layers described herein can be determined from the average of at least 2 separate measurements taken of a dry layer, for example, using electron microscopy. Similarly, the average dry thickness or width of lines, grid lines, or other pattern features described herein can be the average of at least 2 separate measurements taken, for example, using electron microscopy. The "average diameter" of silver nanoparticles can be determined by at least two measurements using light scattering or electron microscopy, such as transmission electron microscopy ("TEM").

The term "aspect ratio" is used to define the morphology of particles including the silver nanoparticles described herein. The term has the well understood meaning of the ratio of the largest dimension to the smallest dimensions of an anisotropic particle such as a platelet or rod. In some embodiments of the present invention, the metal nanoparticles (such as silver nanoparticles) used in metal-containing (such as silver-containing) embodiments of compositions (B) and (D) described below is less than 2, or even less than 1.5 and such metal particles are generally considered to be low aspect ratio or near-spherical in morphology. In some embodiments, the silver nanoparticles in silver-containing embodiments of compositions (B) and (D) have an aspect ratio of greater than or equal to 2 and have plate-like or platelet morphology.

In many embodiments of substrates and articles described herein, the transparent substrate and all accompanying layers or features on one or both supporting sides, are considered transparent meaning that its integrated transmittance over the noted visible region of the electromagnetic spectrum (for example from 410 nm to 700 nm) is 70% or more, or more likely at least 80% or even 90% or more, as measured for example using a spectrophotometer and known techniques.

Unless otherwise indicated herein, the term "metallic" refers to materials that are single pure metals, metal alloys, metallic oxides, metallic sulfides, and materials containing metallic particles such as micro-particles, nanoparticles, or grains.

Uses

The compositions, articles, and methods described or claimed herein include the use of reactive polymers and humectants in ink jettable and UV-curable compositions that can also contain water-soluble complexes containing either reducible metal ions or reduced metal nanoparticles. The resulting water-soluble complexes have a variety of applications after they have been formed.

In some embodiments, the water-soluble complexes containing the reactive polymers can be ink jet printed onto various substrates in a patterned manner for further chemical reactions such as providing catalytic silver or palladium nanoparticles that can then be used to form high resolution electrically-conductive metal patterns as described herein. Such electrically-conductive metal patterns can be incorporated into various devices including but not limited to touch screens or other display devices that can be used in numerous industrial, consumer, and commercial products. Thus, the water-soluble complexes can be incorporated into silver-containing compositions described below where efficient photopolymerization and metal pattern formation is needed in various articles or devices.

Touch screen technology can comprise different touch sensor configurations including capacitive and resistive touch sensors. Capacitive touch sensors can be used in electronic devices with touch-sensitive features. These electronic devices can include but are not limited to, televisions, monitors, and projectors that can be adapted to display images including text, graphics, video images, movies, still images, and presentations. The image devices that can be used for these display devices that can include cathode ray tubes (CRT), projectors, flat panel liquid crystal displays (LCD), light emitting diode (LED) systems, organic light emitting diode (OLED) systems, plasma systems, electroluminescent displays (ELD), and field emission displays (FED). For example, the present invention can be used to forming electrodes and peripheral electronic leads in thin film printed batteries or photovoltaic devices.

Systems and methods of fabricating flexible and optically compliant touch sensors, batteries, or other printed electronics in a high-volume roll-to-roll manufacturing process wherein micro electrically-conductive features can be created in a single pass are possible using the present invention. The water-soluble silver-containing compositions can be used in such systems and methods with multiple ink jet printers to form multiple high resolution electrically-conductive images from predetermined designs of patterns provided in those multiple ink jet printers. Multiple patterns can be ink jet printed on one or both sides of a substrate. For example, one predetermined pattern can be ink jet printed on one side of the substrate and a different predetermined pattern can be ink jet printed on the opposing side of the substrate that can be a continuous web.

In other embodiments, the present invention can be used to provide silver-containing articles that can be used for anti-fouling or antimicrobial purposes in various uses such as in aquatic or marine environments, or in clothing or medical devices.

Ink Jettable and UV-Curable Compositions

The ink jettable and UV-curable compositions of this invention contain only one essential component: one or more reactive polymers as described below (besides a necessary aqueous medium such as water), and one or more optional components such as humectants, surfactants, and water-soluble or water-dispersible polymers as described below. The single essential component is the only one needed for forming an ink jettable and UV-curable composition but as noted below, the optional components can be added to improve various properties including, dispersibility, manufacturability, printability, ink jetted image evaluation, storage stability, or other properties.

Reactive Polymers

In general, the reactive polymers useful in the practice of this invention have two essential features. They comprise pendant groups that are capable of crosslinking via [2+2] photocycloaddition (defined below) upon exposure to suitable radiation (usually UV radiation). In addition, the reactive polymers also comprise pendant metal complexing water-solubilizing groups such as pendant sulfonate or sulfonic acid groups or carboxylic acid or carboxylate groups that provide sufficient water-solubility or water-dispersibility as well as metal complexation properties. While the reactive polymers can be supplied as aqueous-based compositions, they can also be used when complexed with either reducible metal ions (for example, reducible silver ions, copper ions, or palladium ions) or metal nanoparticles (for example, silver nanoparticles, copper nanoparticles, or palladium nanoparticles) as described below on a substrate that can have a large or small surface, including the outer surfaces of inorganic or organic particles and then dried. Thus, the reactive polymers are reducible metal ion or metal complexing (as described below), water-soluble, and UV-curable or photocrosslinkable.

The reactive polymers can be either condensation or vinyl polymers as long as the requisite pendant crosslinkable and water-solubilizing groups are connected to and arranged along the reactive polymer backbone. In most embodiments, the useful reactive polymers are vinyl polymers derived from appropriately selected ethylenically unsaturated polymerizable monomers using known free radical solution polymerization techniques and conditions, initiators, surfactants, catalysts, and solvents, all of which would be readily apparent to one skilled in the art from the teaching provided herein.

(a1) Recurring Units Having Metal Complexing Water-Solubilizing Groups:

Some embodiments of the reactive polymers useful in the present invention comprise (a1) recurring units comprising pendant metal complexing water-solubilizing groups that can include but are not limited to, pendant sulfonic acid and sulfonate groups as well as pendant carboxylic acid groups, pendant carboxylate groups, pendant phosphonic acid groups, and pendant phosphonate groups. Such recurring units can be provided by polymerization of suitable ethylenically unsaturated polymerizable monomers containing such metal complexing water-solubilizing groups such as acrylic acid, methacrylic acid, vinyl phosphonic acid, vinyl phosphonate, itaconic acid, maleic anhydride, maleic acid, fumaric acid, citraconic acid, vinyl benzoic acid, 2-carboxyethyl acrylate, 2-carboxyethyl methacrylate as well as the ethylenically unsaturated polymerizable monomers described below for the (a2) recurring units. Partially or fully neutralized counterparts of such ethylenically unsaturated polymerizable monomers are also often readily available and useful for certain polymer synthetic conditions.

Alternatively, such recurring units can be provided by polymerizing certain precursor ethylenically unsaturated polymerizable monomers that comprise pendant precursor groups that can in turn be reacted to provide the desired pendant metal complexing water-solubilizing groups.

The (a1) recurring units described above having the pendant metal complexing water-solubilizing groups are present in the reactive polymers in an amount of at least 40 mol %, or even at least 40 mol %, and up to and including 80 mol % or up to and including 95 mol %, all amounts based on the total recurring units in the reactive polymer.

(a2) Recurring Units Having Sulfonate or Sulfonic Acid Groups:

Other embodiments of the reactive polymers useful in the present invention comprise (a2) recurring units comprising pendant sulfonate groups and pendant sulfonic acid groups, or mixtures of both pendant sulfonic acid and pendant sulfonate groups. Such (a2) recurring units can be provided by polymerization of suitable ethylenically unsaturated polymerizable monomers containing such water-solubilizing groups such as vinyl sulfonic acid, styrene sulfonic acid, 2-acrylamido-2-methyl-1-propane sulfonic acid, 2-sulfoethyl methacrylate, 3-sulfopropyl methacrylate, styrene sulfonates, and 3-sulfopropyl acrylate. Partially or fully neutralized counterparts of such monomers are also often readily available and useful for certain polymer synthetic conditions.

Alternatively, such recurring units can be provided by polymerizing certain precursor ethylenically unsaturated polymerizable monomers that comprise pendant precursor groups that can in turn be reacted to provide the desired pendant sulfonic acid or pendant sulfonate groups. For example, such monomers include but are not limited to, hydroxy or amino-containing compounds such as 2-hydroxyethyl acrylate, 2-hydroxyethyl methacrylate, 2-aminoethyl methacrylate, and 2-aminoethyl acrylate that can be reacted using a variety of sulfonating agents to provide the desired pendant sulfonic acid or pendant sulfonate groups.

The (a2) recurring units described above having the pendant sulfonic acid or pendant sulfonate groups are present in the reactive polymers in an amount of at least 5 mol % and up to and including 80 mol % or up to and including 95 mol %, all amounts based on the total recurring units in the reactive polymer.

Crosslinkable (b) Recurring Units:

The reactive polymers used in the present invention also comprise (b) recurring units comprising a pendant group capable of crosslinking via [2+2] photocycloaddition when appropriately exposed to suitable radiation. While not limited to the following examples, such photosensitive crosslinkable groups can be chosen from one or more of the following classes of photosensitive crosslinkable groups, all of which can be connected to a recurring unit backbone that is derived from suitable ethylenically unsaturated polymerizable monomers:

(i) a photosensitive —C(=O)—CR=CR¹—Y group wherein R and R¹ are independently hydrogen or an alkyl group having 1 to 7 carbon atoms, a 5- to 6-membered cycloalkyl group, an alkoxy group having 1 to 7 carbon atoms, a phenyl group, or a phenoxy group, and Y is an aryl or heteroaryl group;

(ii) a photosensitive, non-aromatic unsaturated carbocyclic group;

(iii) a photosensitive, aromatic or non-aromatic heterocyclic group comprising a carbon-carbon double bond that is conjugated with an electron withdrawing group;

(iv) a photosensitive non-aromatic unsaturated heterocyclic group comprising one or more amide groups that are conjugated with a carbon-carbon double bond, which photosensitive non-aromatic unsaturated heterocyclic group is linked to the water-soluble backbone at an amide nitrogen atom, or (v) a photosensitive substituted or unsubstituted 1,2-diarylethylene group.

Multiple photosensitive crosslinkable groups can be present from the same or multiple different classes of the crosslinkable groups (i) through (v).

Upon exposure to suitable radiation having a $\lambda_{max}$ of at least 150 nm and up to and including 700 nm, or more likely exposure to radiation having a $\lambda_{max}$ of at least 150 nm and up to and including 450 nm, the noted photosensitive crosslinkable groups are electronically excited such that they can react with other pendant groups in the reactive polymer to form crosslinks for example as the product of [2+2] photocycloaddition reactions.

The reactive polymers particularly become crosslinked among adjacent or proximate (molecularly near enough for [2+2] photocycloaddition crosslinking) crosslinkable groups during or after the noted irradiation. Thus, essential crosslinking can be accomplished using the reactive polymer without additional crosslinking agents. However, if desired, crosslinking can be further provided or enhanced using distinct compounds that are dispersed as crosslinking agents within the compositions or layers comprising one or more reactive polymers. Such crosslinking agents react at either the crosslinkable groups or at other pendant groups such as pendant carboxylic acid groups or epoxy groups depending upon the chemical structure of crosslinking agent. For the pendant crosslinkable groups described herein, crosslinking is achieved by having at least two of such crosslinkable groups in proximity that can react with one another.

The crosslinkable [2+2] photocycloaddition groups incorporated into the reactive polymers can absorb photoexposing radiation as described above to form an electronically excited state that can undergo pericyclic ring formation to form stable covalent crosslinks. These crosslinks between the polymer chains cause the reactive polymer to become water-insoluble, although the water-insoluble reacted polymer can still absorb and transport water, ions, or other small molecules. The photoexposing radiation can be followed by additional curing or heating procedures (described below) to allow the excited [2+2] photocycloaddition groups to properly align with non-excited [2+2] photocycloaddition groups to form additional crosslinks. Curing can be shortened with higher temperatures.

The crosslinked, water-insoluble complex containing the crosslinked, water-insoluble reacted polymer can be crosslinked at a level that imparts water-insolubility and adhesion to a substrate, but still allows rapid diffusion of water, metal ions, and other small molecules. This type of water-compatible composition is sometimes referred to as a hydrogel. The diffusivity of the complex of crosslinked reacted polymer containing either reducible metal ions or metal nanoparticles can be controlled by designing the level of crosslinking and the addition of hydrophobic recurring units such as the (c) and (d) recurring units described below.

The (b) recurring units comprising the noted photosensitive crosslinkable [2+2] photocycloaddition groups can be present in the reactive polymers in an amount of at least 5 mol % or typically of at least 5 mol % and up to and including 50 mol %, or even of at least 10 mol % and up to and including mol %, all amounts based on the total recurring units in the reactive polymer.

In the (i) class of pendant photosensitive, crosslinkable groups that can be present in recurring units arranged along the reactive polymer backbone can comprise —C(=O)—CR=CR¹—Y groups wherein R, R¹, and Y are defined as follows.

Specifically, R and R¹ can be independently hydrogen or substituted or unsubstituted alkyl groups having at least 1 to 7 carbon atoms (including substituted or unsubstituted methyl, ethyl, isopropyl, t-butyl, hexyl, and benzyl groups, and others that would be readily apparent to one skilled in the art), substituted or unsubstituted cycloalkyl group having 5 or 6 carbon atoms in the ring (such as cyclopentyl, cyclohexyl, 4-methylcyclohexyl, and others that would be readily apparent to one skilled in the art), substituted or unsubstituted phenyl groups (such as phenyl, tolyl, and xylyl groups, and others that would be readily apparent to one skilled in the art), substituted or unsubstituted alkoxy groups having 1 to 7 carbon atoms (such as methoxy, ethoxy, benzoxy, and others readily apparent to one skilled in the art), or substituted or unsubstituted phenoxy groups (such as phenoxy, 2,4-dimethylphenoxy, and others that would be readily apparent to one skilled in the art). In some embodiments, R and R¹ can also be nitro, cyano, or halogen groups.

More particularly, R and R¹ can be independently hydrogen or substituted or unsubstituted methyl, ethyl or phenyl groups, especially when Y is a substituted or unsubstituted phenyl group as described below.

Y can be a substituted or unsubstituted carbocyclic aryl group, or a substituted or unsubstituted heteroaryl group having one or more heteroatoms (oxygen, sulfur, or nitrogen) and sufficient carbon atoms to complete an aromatic heterocyclic ring. Such aromatic rings can have one or more substituents that do not adversely affect the desired behavior in the crosslinking reactions induced by the irradiation described herein.

Useful Y groups can be either heterocyclic or carbocyclic rings having desired aromaticity and any of these rings can be substituted with one or more substituents that do not adversely affect the function of the reactive polymer. Representative aromatic Y groups include but are not limited to, substituted or unsubstituted phenyl, naphthyl, anthracyl, 4-nitrophenyl, 2,4-dichlorophenyl, 4-ethylphenyl, tolyl, 4-dodecylphenyl, 2-nitro-3-chlorophenyl, 4-methoxyphenyl, 2-furyl, 2-thienyl, 3-indolyl, and 3-pyridyl rings. The substituted or unsubstituted phenyl rings are particularly useful including but not limited to phenyl, tolyl, xylyl, 4-methoxyphenyl, hydroxyphenyl, and chlorophenyl groups. Substituted or unsubstituted phenyl or 3-pyridyl groups are particularly useful Y groups.

The pendant groups comprising the crosslinkable and photosensitive —C(=O)—CR=CR¹—Y groups are therefore connected to the reactive polymer backbone by means of a single connecting bond or a linking group ($R^2$) as described below.

In particular, the essential recurring units comprising the noted crosslinkable groups can be derived from any ethylenically unsaturated polymerizable monomer having appropriate pendant groups comprising one or more crosslinkable —C(=O)—CR=CR¹—Y groups wherein R, R¹, and Y are as defined above.

More particularly, such (b) recurring units can be further defined in reference to the following Structure (-$A_i$-) comprising crosslinkable groups:

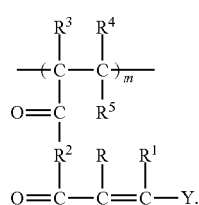

(-$A_i$-)

In Structure (-$A_i$-), R, R¹, and Y are as defined above. $R^2$ can be a divalent linking group including but not limited to, substituted or unsubstituted alkylene (including haloalkylenes and cyanoalkylenes), alkyleneoxy, alkoxyalkylene, iminoalkylene, cycloalkylene, aralkylene, cycloalkylenealkylene, and aryloxyalkylene groups wherein the divalent hydrocarbon groups can comprise 1 to 20 carbon atoms (in either linear, branched, or cyclic form). A skilled worker in polymer chemistry would be able to design other useful linking groups using suitable number of carbon and hetero (oxygen, nitrogen, or sulfur) atoms in an order and arrangement that are chemically possible. Particularly useful $R^2$ divalent groups are substituted or unsubstituted alkylene groups such as substituted or unsubstituted ethylene or propylenes.

$R^3$, $R^4$, and $R^5$ can be independently hydrogen, a halogen, a substituted or unsubstituted alkyl group having 1 to 6 carbon atoms, a substituted or unsubstituted cyclohexyl group, or a substituted or unsubstituted phenyl group. In particular, $R^3$, $R^4$, and $R^5$ can be independently hydrogen, chloro, methyl, or ethyl groups.

Some particularly useful ethylenically unsaturated polymerizable monomers from which -$A_i$- recurring units can be derived include:
2-cinnamoyl-oxyethyl methacrylate,
2-cinnamoyl-oxyethyl acrylate, and
2-[3-(3-pyridyl)acryloyl]ethyl methacrylate.

The -$A_i$- recurring units can also be formed after formation of a water-soluble precursor reactive polymer having precursor -$A_i$- recurring units. For example, a water-soluble precursor reactive polymer can be prepared with recurring units derived from vinyl alcohols or acrylate monomers having pendant hydroxyl groups, and the pendant hydroxyl groups can be reacted with cinnamoyl chloride (or similar substituted cinnamoyl-like chloride reactants) to form the desired -$A_i$- (or similar) recurring units with pendant water-solubilizing sulfonic acid or sulfonate groups already present before the reaction to form the -$A_i$- recurring units.

(ii) Another class of useful photosensitive crosslinkable groups arranged along the reactive polymer backbone can comprise pendant photosensitive (crosslinkable), non-aromatic unsaturated carbocyclic groups including but not limited to, cyclopropene groups, cyclobutene groups, cyclopentadiene groups, cyclohexene groups, cyclohexadiene groups, cycloheptene groups, cycloheptadiene groups, cycloheptatriene groups, cyclooctene groups, indene groups, dihydronaphthalene groups, and norbornene groups. Any of these photosensitive groups can be substituted with one or more substituents that will not interfere with the desired properties of the reactive polymer. Where appropriate, such non-aromatic unsaturated carbocyclic groups can also contain one or more carbon-containing fused rings. The cyclopropene groups including the unsaturated cyclopropene groups can be particularly useful.

In general, such useful recurring units can be represented by the following Structure (-$A_{ii}$-):

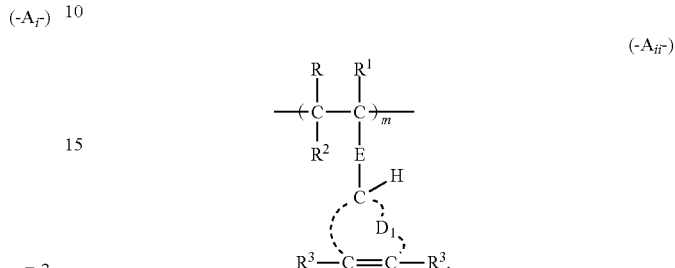

(-$A_{ii}$-)

Specifically, R, R¹, and $R^2$ in Structure (-$A_{ii}$-) can be independently hydrogen or substituted or unsubstituted alkyl groups having at least 1 to 7 carbon atoms (including substituted or unsubstituted methyl, ethyl, isopropyl, t-butyl, hexyl, and benzyl groups, and others that would be readily apparent to one skilled in the art), substituted or unsubstituted cycloalkyl group having 5 or 6 carbon atoms in the ring (such as cyclopentyl, cyclohexyl, 4-methylcyclohexyl, and others that would be readily apparent to one skilled in the art), substituted or unsubstituted phenyl groups (such as phenyl, tolyl, and xylyl groups, and others that would be readily apparent to one skilled in the art), substituted or unsubstituted alkoxy groups having 1 to 7 carbon atoms (such as methoxy, ethoxy, benzoxy, and others readily apparent to one skilled in the art), or substituted or unsubstituted phenoxy groups (such as phenoxy, 2,4-dimethylphenoxy, and others that would be readily apparent to one skilled in the art). In some embodiments, R and R¹ can also be nitro, cyano, or halogen groups.

More particularly, R, R¹, and $R^2$ in Structure (-$A_{ii}$-) can be independently hydrogen or substituted or unsubstituted methyl, ethyl or phenyl groups, and more particularly, each of these groups is hydrogen or methyl.

E can be a divalent linking group including but not limited to, substituted or unsubstituted alkylene (including haloalkylenes and cyanoalkylenes), alkyleneoxy, alkoxyalkylene, iminoalkylene, cycloalkylene, aralkylene, cycloalkylenealkylene, aryloxyalkylene groups wherein the divalent hydrocarbon groups can comprise 1 to 20 carbon atoms (in either linear, branched, or cyclic form), carbonyloxy, oxycarbonyl, amido, keto, carbonate, carbamate, and urea. Particularly useful E divalent groups are substituted or unsubstituted alkylene groups such as substituted or unsubstituted ethylene or propylenes, or oxycarbonyl.

In Structure (-$A_{ii}$-), $D_1$ can represent the carbon atoms necessary to complete a three-membered to seven-membered non-aromatic unsaturated carbocyclic group (or ring), or particularly the carbon atoms necessary to complete a non-aromatic, unsaturated 3-membered to 7-membered carbocyclic group (or ring) such as a cyclopropene ring, a cyclobutene ring, a cyclopentene ring, a cyclohexene ring, or a cycloheptene ring. $D_1$ can also represent the saturated or unsaturated carbon atoms to provide an indene or dihydronaphthalene group, or polycyclic rings such as a norbornene group.

Moreover, in Structure (-$A_{ii}$-), $R^3$ can be hydrogen, a substituted or unsubstituted alkyl group having 1 to 12 carbon atoms (such as methyl, ethyl, isopropyl, amyl, hexyl, nonyl, decyl, and dodecyl), or a substituted or unsubstituted aryl group having 6 or 10 carbon atoms in the ring. Such groups can be substituted with one or more hydroxy, halogen, carbonyl, cyano, alkyl, or alkoxy groups.

In Structure (-$A_{ii}$-), m can represent the molar amounts of the recurring units that would satisfy the amounts described above for the water-soluble polymer.

Some particularly useful (b) recurring units of this type represented by the following Structure (-$A_{ii2}$-) or (-$A_{ii3}$-):

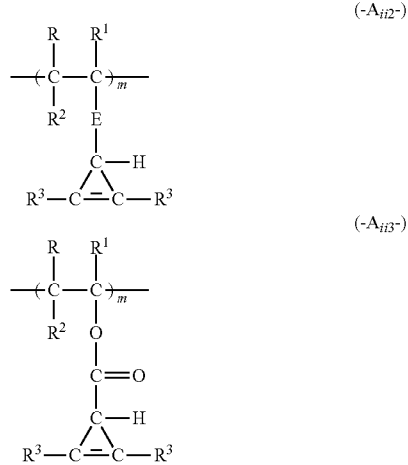

wherein R, $R^1$, $R^2$, $R^3$, and E are as defined above for Structure (-$A_i$-).

Some useful recurring units of this type can be derived from:
2-cyclopropene-1-carboxylic acid, 2,3-diphenyl-, 2-[(2-methyl-1-oxo-2-propen-1-yl)oxy]ethyl ester;
2-cyclopropene-1-carboxylic acid, 2,3-diphenyl-, 2-[(2-methyl-1-oxo-2-propen-1-yl)amino]ethyl ester;
4-(2,3-diphenyl-2-cyclopropene-1-carbonyloxy) styrene;
4-(2,3-diphenyl-2-cyclopropene-1-carbonylamino) styrene; and
4-(2,3-diphenyl-2-cyclopropene-1-carbonyloxy)ethane.

Class (iii) photosensitive crosslinking groups in the reactive polymers comprise pendant photosensitive (crosslinkable), aromatic or non-aromatic heterocyclic groups, each of which comprises a carbon-carbon double bond (>C=C<) that is conjugated with one or more electron withdrawing groups. In many embodiments, the carbon-carbon double bond is conjugated with one or two of the same or different electron withdrawing groups, and in most embodiments, the carbon-carbon double bond is conjugated with only one electron withdrawing group.

It is to be understood that the pendant photosensitive, aromatic or non-aromatic heterocyclic groups can be single ring groups formed of carbon and hetero atoms (such as nitrogen, sulfur, and oxygen), or they can be fused ring groups with two or more fused rings formed from carbon and suitable heteroatoms.

Useful electron withdrawing groups that can be conjugated with the carbon-carbon double bond would be readily apparent to one skilled in the art as the term "electron withdrawing" in reference to a chemical group is well known in the art. However, it is particularly useful when such electron withdrawing groups include but are not limited to, carbonyl, ester, thioester, amide, imine, amidine, ether, thioether, and amine groups (or moieties). More generally, the photosensitive (crosslinkable) aromatic or non-aromatic heterocyclic group can be a cyclic group that comprises an α,β-unsaturated ketone, α,β-unsaturated lactone, α,β-unsaturated lactam, α,β-unsaturated ether, α,β-unsaturated thioether, or α,β-unsaturated amine group. Of these types of photosensitive (crosslinkable) non-aromatic aromatic or heterocyclic groups, those containing a carbonyl group are particularly useful.

For example, the reactive polymers can comprise pendant photosensitive, aromatic or non-aromatic heterocyclic groups selected from the group consisting of coumarin, thiocoumarin, quinone, benzoquinone, naphthoquinone, pyran, thiopyran, benzopyran, benzothiopyran, pyranone, thiopyranone, pyridinone, quinoline, and quinolinone groups. Of these photosensitive aromatic or non-aromatic heterocyclic groups, pendant photosensitive coumarin or quinolinone groups are useful and the pendant photosensitive coumarin groups are most useful because they can be readily prepared.

Any of the photosensitive aromatic or aromatic or non-aromatic heterocyclic groups can be substituted with one or more substituents that will not interfere with the desired properties of the reactive polymer.

In general, useful (b) recurring units can be represented by the following Structure (-$A_{iii}$-):

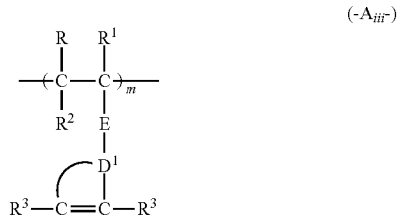

Specifically, in Structure (-$A_{iii}$-), R, $R^1$, and $R^2$ can be independently hydrogen or substituted or unsubstituted alkyl groups having at least 1 to 7 carbon atoms (including substituted or unsubstituted methyl, ethyl, isopropyl, t-butyl, hexyl, and benzyl groups, and others that would be readily apparent to one skilled in the art), substituted or unsubstituted cycloalkyl group having 5 or 6 carbon atoms in the ring (such as cyclopentyl, cyclohexyl, 4-methylcyclohexyl, and others that would be readily apparent to one skilled in the art), substituted or unsubstituted phenyl groups (such as phenyl, tolyl, and xylyl groups, and others that would be readily apparent to one skilled in the art), substituted or unsubstituted alkoxy groups having 1 to 7 carbon atoms (such as methoxy, ethoxy, benzoxy, and others readily apparent to one skilled in the art), or substituted or unsubstituted phenoxy groups (such as phenoxy, 2,4-dimethylphenoxy, and others that would be readily apparent to one skilled in the art). In some embodiments, R and $R^1$ can also be nitro, cyano, or halogen groups.

More particularly, R, $R^1$, and $R^2$ can be independently hydrogen or substituted or unsubstituted methyl, ethyl or phenyl groups, and more particularly, each of these groups can be hydrogen or methyl.

E in Structure (-$A_{iii}$-) can be a single bond or divalent linking group that can be connected to a carbon atom within $D_1$. Thus, while E appears to be connected directly to $D_1$, E can be connected to any carbon represented by $D_1$. For example, E can be a divalent linking group including but not limited to, substituted or unsubstituted alkylene (including haloalkylenes and cyanoalkylenes), alkyleneoxy, alkoxyalkylene, iminoalkylene, cycloalkylene, aralkylene, cycloalkylene-alkylene, aryloxyalkylene groups wherein the divalent hydrocarbon groups can comprise 1 to 20 carbon atoms (in either linear, branched, or cyclic form), carbonyloxy, oxycarbonyl, amido, keto, carbonate, carbamate, and urea. A skilled worker in polymer chemistry would be able to design other useful linking groups using suitable number of carbon and hetero (oxygen, nitrogen, or sulfur) atoms in an order and arrangement that are chemically possible. Particularly useful E divalent groups are substituted or unsubstituted alkylene groups such as substituted or unsubstituted ethylene or propylenes or oxycarbonyl.

In Structure ($-A_{iii}-$), $D_1$ represents the carbon and hetero (sulfur, oxygen, or nitrogen particularly) atoms necessary to complete a three-membered to fourteen-membered aromatic or non-aromatic heterocyclic group (or ring) that includes the carbon-carbon double bond shown in Structure ($-A_{iii}-$). However, it is essential that either $D_1$ or at least one of the $R^3$ groups (defined below) comprises at least one (and optionally more) electron withdrawing groups that are conjugated with the carbon-carbon double bond shown in Structure ($-A_{iii}-$).

$D_1$ can also represent the saturated or unsaturated carbon or hetero atoms to provide one or more fused rings such as naphthoquinone, benzopyran, benzothiopyran, benzopyran-2-one (coumarin), quinoline, and quinolinone polyrings. Other useful $D_1$ ring systems optionally comprising at least one electron withdrawing group that is conjugated with the carbon-carbon double bond would be readily apparent to one skilled in the art.

Moreover, in Structure ($-A_{iii}-$), $R^3$ is hydrogen, a substituted or unsubstituted alkyl group having 1 to 12 carbon atoms (such as methyl, ethyl, isopropyl, amyl, hexyl, nonyl, decyl, and dodecyl), a substituted or unsubstituted aryl group having 6 or 10 carbon atoms in the ring, a substituted or unsubstituted alkoxy group having 1 to 12 carbon atoms (such as methoxy, 2-ethoxy, t-butoxy, and n-hexoxy), substituted or unsubstituted aryloxy group having 6 or 10 carbon atoms in the ring (such as phenoxy and naphthoxy), cyano, halo, or carbonyl-containing group. Such carbonyl-containing groups include but are not limited to, aldehyde, ketone, carboxylic acid, ester, and amide groups. Such carbonyl-containing groups can be conjugated with the carbon-carbon double bond in Structure (A).

In Structure ($-A_{iii}-$), m can represent the molar amounts of the noted recurring units as described above for the reactive polymers.

Some useful recurring units of this type can be derived from:
7-(2-methacryloyloxyethoxy)-4-methylcoumarin,
7-(2-methacryloyloxyethoxy)-coumarin,
7-(3-methacryloyloxysulfopropyl)-4-methylcoumarin,
7-(methacryloyloxy)-4-methylcoumarin,
6-(methacryloyloxy)-4-methylcoumarin,
6-(2-methacryloyloxyethoxy)-4-methylcoumarin,
7-(2-methacryloyloxyethoxy)-quinoline-2-one,
7-(2-methacryloyloxyethoxy)-4-methylquinoline-2-one, and
5-(2-methacryloyloxyethoxy)-naphthoquinone.

Yet another class (iv) comprise pendant photosensitive (crosslinkable), non-aromatic unsaturated heterocyclic groups, each of which non-aromatic unsaturated heterocyclic groups can comprise one or more amide groups [$>N-C(=O)-$], and each of the amide groups is arranged in the heterocyclic group (ring) in conjugation with a carbon-carbon double bond ($>C=C<$). In many embodiments, such heterocyclic groups have only one or two amide groups and the carbon-carbon double bond is conjugated with the one or two amide groups arranged within the non-aromatic unsaturated heterocyclic group (ring). In most embodiments, the carbon-carbon double bond is conjugated with the only one amide group in the non-aromatic unsaturated heterocyclic group (ring).

It is to be understood that the pendant photosensitive, non-aromatic unsaturated heterocyclic groups can be single ring groups formed of carbon and hetero atoms (such as nitrogen, sulfur, and oxygen), or they can be fused ring groups with two or more fused rings formed from carbon and suitable heteroatoms. In most embodiments, the photosensitive, non-aromatic unsaturated heterocyclic groups are single ring groups having 5 to 7 carbon and heteroatoms (usually nitrogen atoms) forming the ring. At least one, and likely two of the carbon atoms in the rings also form carbonyl ($>C=O$) groups.

Particularly useful reactive polymers can comprise pendant photosensitive, non-aromatic unsaturated heterocyclic groups selected from the group consisting of substituted or unsubstituted maleimide and thymine groups. Of these photosensitive non-aromatic unsaturated heterocyclic groups, the substituted maleimide groups are most useful because they can be readily prepared.

Any of the photosensitive non-aromatic unsaturated heterocyclic groups can be substituted with one or more substituents that will not interfere with the desired properties of the reactive polymer and the reactions necessary for crosslinking.

In general, useful (b) recurring units can be represented by the following Structure ($-A_{iv}-$):

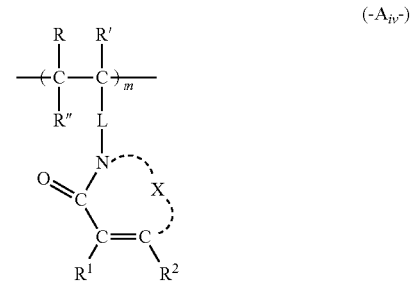

($-A_{iv}-$)

In Structure ($-A_{iv}-$), R, R', and R" can be independently hydrogen or substituted or unsubstituted alkyl groups having at least 1 to 7 carbon atoms (including substituted or unsubstituted methyl, ethyl, isopropyl, t-butyl, hexyl, and benzyl groups, and others that would be readily apparent to one skilled in the art), substituted or unsubstituted cycloalkyl group having 5 or 6 carbon atoms in the ring (such as cyclopentyl, cyclohexyl, 4-methylcyclohexyl, and others that would be readily apparent to one skilled in the art), substituted or unsubstituted phenyl groups (such as phenyl, tolyl, and xylyl groups, and others that would be readily apparent to one skilled in the art), substituted or unsubstituted alkoxy groups having 1 to 7 carbon atoms (such as methoxy, ethoxy, benzoxy, and others readily apparent to one skilled in the art), or substituted or unsubstituted phenoxy groups (such as phenoxy, 2,4-dimethylphenoxy, and others that would be readily apparent to one skilled in the art). In some embodiments, R, R', and R" can also be nitro, cyano, or halogen groups.

More particularly, R, R', and R" can be independently hydrogen or substituted or unsubstituted methyl, ethyl or phenyl groups, and more particularly, each of these groups can be hydrogen or methyl.

In Structure (-$A_{iv}$-), L can be a single bond or divalent linking group that can be connected to a nitrogen atom (as shown) within the photosensitive non-aromatic unsaturated heterocyclic group. For example, L can be a divalent hydrocarbon or aliphatic linking group that generally include 1 to 10 carbon, nitrogen, or oxygen atoms in the chain and can include but not limited to, substituted or unsubstituted alkylene (including haloalkylenes and cyanoalkylenes); alkyleneoxy; alkoxyalkylene; iminoalkylene; cycloalkylene; aralkylene; cycloalkylene-alkylene; or aryloxyalkylene groups wherein the divalent hydrocarbon groups can comprise 1 to 20 carbon atoms (in either linear, branched, or cyclic form) and can be connected or interrupted with heteroatom-containing groups such as oxy, carbonyl, carbonyloxy, oxycarbonyl, amino, amido, carbonate, carbamate, and urea, or any combination thereof. A skilled worker in polymer chemistry would be able to design other useful linking groups using suitable number of carbon and hetero (oxygen, nitrogen, or sulfur) atoms in an order and arrangement that are chemically possible. Particularly useful L divalent groups are substituted or unsubstituted alkylene groups such as substituted or unsubstituted methylene, ethylene, or a propylene (any isomer), or such groups can be used in combination with an oxycarbonyl (such as from an acrylic acid ester group).

In Structure (-$A_{iv}$-), X represents the 1 to 3 carbon and heteroatoms (usually nitrogen atoms), which in combination with the remaining shown nitrogen and carbon atoms, complete a five- to seven-membered photosensitive non-aromatic unsaturated heterocyclic ring. In most embodiments, X represents at least one carbon atom (for example, a carbonyl carbon atom), or at least one carbon atom (for example, a carbonyl carbon atom) and at least one nitrogen atom such that the resulting amide group is conjugated with the shown carbon-carbon double bond.

In Structure (-$A_{iv}$-), $R^1$ and $R^2$ are independently hydrogen or a substituted or unsubstituted alkyl group having 1 to 10 carbon atoms (such as substituted or unsubstituted methyl, ethyl, isopropyl, amyl, hexyl, nonyl, and decyl groups), or a substituted or unsubstituted cycloalkyl group having 5 or 6 carbon atoms in the unsaturated carbocyclic ring (such as substituted cyclohexyl groups). $R^1$ and $R^2$ are likely to be the same group such as hydrogen, or unsubstituted methyl or unsubstituted ethyl groups.

Some particular useful representations of such (b) recurring units are shown in the following Structures (-$A_{iv1}$-), (-$A_{iv2}$-), and (-$A_{iv3}$-)

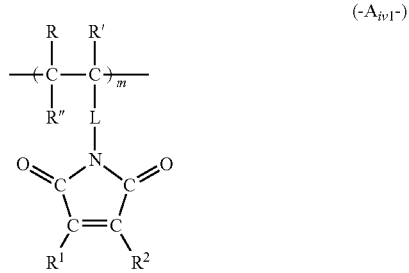

(-$A_{iv1}$-)

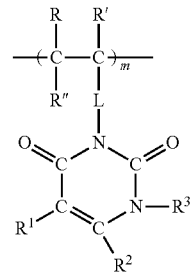

(-$A_{iv2}$-)

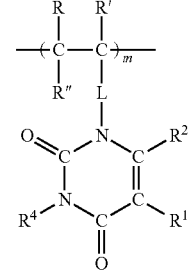

(-$A_{iv3}$-)

wherein R, R', R", L, $R^1$, and $R^2$ are as defined above in Structure (-$A_{iv}$-) and m is defined below.

Moreover, in Structures (-$A_{iv2}$-) and (-$A_{iv3}$-), $R^3$ and $R^4$ are independently hydrogen, or substituted or unsubstituted alkyl groups or substituted or substituted cycloalkyl groups for example as used to define $R^1$ and $R^2$ shown above.

It should be understood that a reactive polymer used in this invention can comprise a variety of different photosensitive non-aromatic unsaturated heterocyclic groups in recurring units. For example, the reactive polymer can have recurring units represented by both Structures (-$A_{iv1}$-) and either (-$A_{iv2}$-) or (-$A_{iv3}$-). Alternatively, the reactive polymer can have recurring units represented by both Structures (-$A_{iv2}$-) and (-$A_{iv3}$-). Still again, the reactive polymer can have recurring units represented by all of Structure (-$A_{iv1}$-), (-$A_{iv2}$-), and (-$A_{iv3}$-).

Still another class (v) of useful photosensitive and crosslinkable pendant groups comprises photosensitive substituted or unsubstituted 1,2-diarylethylene groups. Such groups can be generally represented as —$Ar_1$-ethylene-$Ar_2$ wherein $Ar_1$ is a divalent, substituted or unsubstituted heterocyclic or carbocyclic aromatic group and $Ar_2$ is a monovalent, substituted or unsubstituted heterocyclic or carbocyclic aromatic group.

For example, some useful reactive polymers comprise pendant groups comprising photosensitive substituted or unsubstituted 1,2-diaryl ethylene groups selected from stilbene, styrylnaphthalene, styrylpyridine, styrylpyridinium, styrylquinoline, styrylquinolinium, styrylthiazole, styrylthiazolium, naphthrylphenyl (naphthylene-ethylene-phenyl), naphthrylpyridinium, naphthylthiazolium, 1-pyridyl-2-thiazolylethylene, and 1,2-pyridiylethylene groups. The pendant groups comprising photosensitive stilbene, styrylpyridinium, styrylquinoline, or styrylthiazolium groups are particularly useful.

Any of the photosensitive 1,2-diarylethylene groups can be substituted with one or more substituents that will not interfere with the desired properties of the reactive polymer and the reactions necessary for crosslinking.

In general, such useful (b) recurring units can be represented by the following Structure (-$A_v$-) showing both reactive polymer backbone and pendant groups attached thereto:

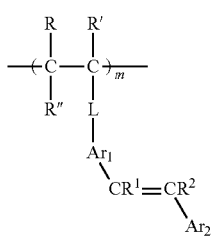

In Structure (-A$_v$-), R, R', and R" can be independently hydrogen or substituted or unsubstituted alkyl groups having at least 1 to 7 carbon atoms (including substituted or unsubstituted methyl, ethyl, isopropyl, t-butyl, hexyl, and benzyl groups, and others that would be readily apparent to one skilled in the art), substituted or unsubstituted cycloalkyl group having 5 or 6 carbon atoms in the ring (such as cyclopentyl, cyclohexyl, 4-methylcyclohexyl, and others that would be readily apparent to one skilled in the art), substituted or unsubstituted phenyl groups (such as phenyl, tolyl, and xylyl groups, and others that would be readily apparent to one skilled in the art), substituted or unsubstituted alkoxy groups having 1 to 7 carbon atoms (such as methoxy, ethoxy, benzoxy, and others readily apparent to one skilled in the art), or substituted or unsubstituted phenoxy groups (such as phenoxy, 2,4-dimethylphenoxy, and others that would be readily apparent to one skilled in the art). In some embodiments, R, R', and R" can also be nitro, cyano, or halogen groups.

More particularly, R, R', and R" can be independently hydrogen or substituted or unsubstituted methyl, ethyl or phenyl groups, and more particularly, each of these groups can be hydrogen or substituted or unsubstituted methyl groups.

In Structure (-A$_v$-), L can be a single bond or divalent linking group that can be connected to a nitrogen atom (as shown) within the photosensitive non-aromatic unsaturated heterocyclic group. For example, L can be a divalent hydrocarbon or aliphatic linking group that generally include 1 to 10 carbon, nitrogen, or oxygen atoms in the chain and can include but not limited to, substituted or unsubstituted alkylene (including haloalkylenes and cyanoalkylenes); alkyleneoxy; alkoxyalkylene; iminoalkylene; cycloalkylene; aralkylene; cycloalkylene-alkylene; or aryloxyalkylene groups wherein the divalent hydrocarbon groups can comprise 1 to 20 carbon atoms (in either linear, branched, or cyclic form) and can be connected or interrupted with heteroatom-containing groups such as oxy, carbonyl, carbonyloxy, oxycarbonyl, amino, amido, carbonate, carbamate, and urea, or any combination thereof. A skilled worker in polymer chemistry would be able to design other useful linking groups using suitable number of carbon and hetero (oxygen, nitrogen, or sulfur) atoms in an order and arrangement that are chemically possible. Particularly useful L divalent groups can be substituted or unsubstituted alkylene groups such as substituted or unsubstituted methylene, ethylene, or a propylene (any isomer), or such groups can be used in combination with an oxycarbonyl (such as from an acrylic acid ester group), and aliphatic groups comprising a carbonyloxy group directly attached to the reactive polymer backbone.

Moreover, in Structure (-A$_v$-), Ar$_1$ is a divalent carbocyclic or heterocyclic aromatic group that can be substituted or unsubstituted. For example, Ar$_1$ can be substituted or unsubstituted phenylene, substituted or unsubstituted naphthylene, substituted or unsubstituted pyridinylene, substituted or unsubstituted quinolinylene, substituted or unsubstituted thiazolylene, substituted or unsubstituted pyridinium, substituted or unsubstituted quinolinium, or substituted or unsubstituted thiazolium. As would be understood by one skilled in the art, some of the useful Ar$_1$ groups can be quaternary aromatic rings wherein a nitrogen atom in the aromatic ring is optionally attached to L or is quaternized in a suitable manner, and suitable counterions can be present such as a trifluoromethylsulfonate counterion. When the Ar$_1$ rings are substituted, the one or more substituents can be any moiety that will not adversely affect the photosensitivity of the pendant group or any other properties intended for the reactive polymer. For example, useful substituents can include but are not limited to methyl groups and ethyl groups. Particularly useful Ar$_1$ groups are substituted or unsubstituted phenylene and pyridinium groups.

Ar$_2$ can be a substituted or unsubstituted carbocyclic or heterocyclic aromatic group as defined for Ar$_1$ except that Ar$_2$ is monovalent as shown in Structure (-A$_v$-). Particularly useful Ar$_2$ groups are substituted or unsubstituted phenyl, substituted or unsubstituted naphthalene, substituted or unsubstituted pyridine, substituted or unsubstituted pyridinium, substituted or unsubstituted quinoline, substituted or unsubstituted quinolinium, substituted or unsubstituted thiazole, and substituted or unsubstituted thiazolium groups, with substituted or unsubstituted phenyl, substituted or unsubstituted pyridinium, substituted or unsubstituted quinolinium groups, and substituted or unsubstituted thiazolium groups being particularly useful. Similarly to Ar$_1$, some of the Ar$_2$ aromatic rings can be quaternary aromatic rings having a positive nitrogen atom, and a suitable counterion, such as a halide or trifluoromethylsulfonate, is then present. A skilled worker in the art would readily know about other suitable counterions.

Moreover, In Structure (-A$_v$-), R$^1$ and R$^2$ are independently hydrogen or substituted or unsubstituted alkyl groups having 1 to 10 carbon atoms (such as substituted or unsubstituted methyl, ethyl, isopropyl, amyl, hexyl, nonyl, and decyl groups), or substituted or unsubstituted cycloalkyl groups having 5 or 6 carbon atoms in the unsaturated carbocyclic ring (such as substituted cyclohexyl groups). R$^1$ and R$^2$ are likely to be the same group such as hydrogen, or unsubstituted methyl or unsubstituted ethyl groups.

In some embodiments, the reactive polymer comprises (b) recurring units represented by the following Structure (-A$_{v1}$-) also showing reactive polymer backbone to which pendant groups are attached:

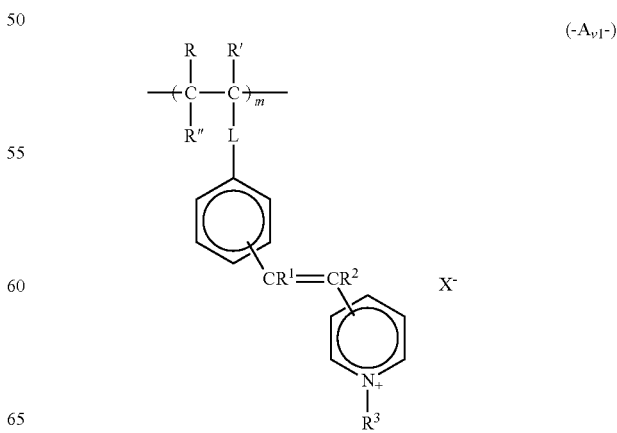

wherein R, R', R" are as defined above and are particularly hydrogen or methyl, L is as described above and particularly comprises a carbonyloxy group directly attached to the backbone, $R^1$ and $R^2$ can be independently hydrogen, methyl, or ethyl, $R^3$ can be a suitable substituted or unsubstituted alkyl, substituted or unsubstituted cycloalkyl, or substituted or unsubstituted aryl group, $X^-$ can be a suitable counterion as described above, and m is as defined below.

In Structures (-$A_v$-) and (-$A_{v1}$-), m can represent the molar amounts of the (b) recurring units as described above for the reactive polymers.

Some useful (b) recurring units of this class can be derived from:

1-methyl-4-[2-(4-(2-methacryloxyethyl)-carbonyloxyphenyl)ethenyl]pyridinium trifluoromethylsulfonate;

1-methyl-4-[2-(4-(2-methacryloxyethyl)-carbonyloxyphenyl)ethenyl]quinolinium trifluoromethylsulfonate;

1-methyl-2-[2-(4-(2-methacryloxyethyl)-carbonyloxyphenyl)ethenyl]thiazolium trifluoromethylsulfonate;

4-[2-(4-(2-methacryloxyethyl)-carbonyloxyphenyl)ethenyl] pyridine; and 1-phenyl-2-[(4-(2-methacryloxyethyl)-carbonyloxyphenyl)] ethylene.

Such useful (b) recurring units can be derived from suitable ethylenically unsaturated polymerizable monomers that can then be polymerized under suitable conditions to provide useful reactive polymers. More likely, such monomers are prepared by attaching a 1,2-diarylethylene group to a polymerizable acrylic group through a linking group by formation of an ester, amide or ether bond. For example 4-formylbenzoic acid can be easily condensed with 4-methylpyridine to form a styrylpyridine group with a carboxylic acid functionality suitable for attachment to a linking group on an acrylic monomer such as 2-hydroxyethylmethacrylate. The carboxylic acid and the hydroxyethyl groups can then be attached by a variety of ester forming reactions well known in the art including the known Mitsunobu reaction.

Optional (c) and (d) Recurring Units:

The reactive polymers used in the present invention can optionally comprise at least 1 mol % and up to and including 93 mol %, or typically at least 10 mol % and up to and including 70 mol %, of (c) recurring units comprising pendant amide, hydroxyl, lactam, phosphonic acid (or phosphonate), or carboxylic acid (or carboxylate) groups, all based on the total amount of recurring units in the reactive polymer, particularly when (a2) recurring units are present. Recurring units comprising pendant hydroxyl, amide, or carboxylic acid groups are particularly useful. It is also useful to have (c) recurring units that comprise multiple different pendant groups from the noted list of pendant groups. If the (a1) recurring units are present in the reactive polymer, any (c) recurring units that are present would be different from those chosen for the (a1) recurring units, for example the (c) recurring units can comprise pendant amide, hydroxyl, or lactam groups or pendant precursor moieties for the pendant amide, hydroxyl, or lactam groups.

When the (a2) recurring units are present, useful pendant precursor groups for the (c) recurring units include but are not limited to, anhydrides, alcohols, amines, lactam, lactone, amide, and ester groups that can be used to provide the various groups noted above for the (c) recurring units.

For example, useful (c) recurring units can be represented by the following Structure (—C—):

wherein B' represents a pendant amide, hydroxy, lactam, phosphonic acid, or carboxylic acid group or precursor groups that can be appropriately converted, which group can be directly attached to the reactive polymer backbone or it can be attached through a suitable divalent linking group.

For example, some useful ethylenically unsaturated polymerizable monomers from which the (c) recurring units can be derived include but are not limited to, (meth)acrylic acid, itaconic acid, maleic anhydride, fumaric acid, maleic acid, citraconic acid, vinyl benzoic acid, 2-carboxyethyl acrylate, 2-carboxyethyl methacrylate, (meth)acrylamide, N-vinyl pyrrolidone, 2-hydroxyethyl methacrylate, 2-aminoethyl methacrylate, vinyl phosphonic acid, N-isopropyl acrylamide, and dimethyl acrylamide.

In addition to the (a1), (a2), (b), and (c) recurring units described above, the reactive polymers can optionally comprise one or more additional recurring units that are different from all (a1), (a2), (b), and (c) recurring units, and herein identified as optional (d) recurring units, in an amount of less than 50 mol %, based on the total recurring units in the reactive polymer. Alternatively, (d) recurring units can be present with (a1), (a2), and (b) recurring units but (c) recurring units are absent.

A skilled polymer chemist would understand how to choose such additional (d) recurring units, and for example, they can be derived from one or more ethylenically unsaturated polymerizable monomers selected from the group consisting of alkyl acrylates, alkyl methacrylates, styrene and styrene derivatives, vinyl ethers, vinyl benzoates, vinylidene halides, vinyl halides, vinyl imides, and other materials that a skilled worker in the art would understand could provide desirable properties to the reactive polymer. Such (d) recurring units can be represented by Structure (-D-) as follows:

wherein the pendant D groups in Structure (-D-) can be for example, hydrogen, substituted or unsubstituted alkyl groups, substituted or unsubstituted aryl groups, alkyl ester groups, aryl ester groups, halogens, or ether groups.

In addition, some (d) recurring units can comprise an epoxy (such as a glycidyl group) or epithiopropyl group derived for example from glycidyl methacrylate or glycidyl acrylate.

In the recurring units described above, R, R', and R" can be the same or different hydrogen, methyl, ethyl, or chloro groups and each type of recurring unit can have the same or different R, R', and R" groups along the reactive polymer backbone. In most embodiments, R, R', and R" are hydrogen or methyl, and R, R', and R" can be the same or different for the various (a1), (a2), (b), (c), and (d) recurring units in a given reactive polymer.

In the Structures shown above, "m," "n," and "p" are used to represent the respective molar amounts of recurring units, based on the total recurring units in a given reactive polymer, so that the sum of m, n, and p equal 100 mol % in a given reactive polymer.

The mol % amounts of the various recurring units defined herein for the reactive polymers defined herein are meant to refer to the actual molar amounts present in the reactive polymers. It is understood by one skilled in the art that the actual mol % values may differ from those theoretically possible from the amount of ethylenically unsaturated polymerizable monomers that are used in the polymerization reaction solution. However, under most polymerization conditions that allow high polymer yield and optimal reaction of all monomers, the actual mol % of each monomer is generally within ±15 mol % of the theoretical amounts.

Representative reactive polymer embodiments include but are not limited to, the following copolymers wherein the molar ratios are theoretical (nominal) amounts based on the actual molar ratio of ethylenically unsaturated polymerizable monomers used in the polymerization process. The actual molar amounts of recurring units can differ from the theoretical (nominal) amounts of monomers if the polymerization reactions are not carried out to completion.

Poly(3-sulfopropyl methacrylate potassium salt-co-2-cinnamoyl-oxyethyl methacrylate) (80:20 mol %);
Poly(3-sulfopropyl methacrylate potassium salt-co-2-cinnamoyl-oxyethyl methacrylate) (70:30 mol %);
Poly(3-sulfopropyl methacrylate potassium salt-co-2-cinnamoyl-oxyethyl methacrylate) (50:50 mol %);
Poly(3-sulfopropyl methacrylate potassium salt-co-methacrylic acid-co-2-cinnamoyl-oxyethyl methacrylate) (50:30:20 mot %);
Poly(3-sulfopropyl methacrylate-co-methacrylic acid-co-2-cinnamoyl-oxomethyl methacrylate) (30:50:20 mol %);
Poly(3-sulfopropyl methacrylate-co-methacrylic acid-co-2-cinnamoyl-oxyethyl methacrylate) (10:70:20 mol %);
Poly(3-sulfopropyl methacrylate-co-methacrylic acid-co-2-cinnamoyl-oxyethyl methacrylate) (5:75:20 mol %);
Poly(3-sulfopropyl methacrylate-co-methacrylic acid-co-2-cinnamoyl-oxyethyl methacrylate) (5:85:10 mol %);
Poly(3-sulfopropyl methacrylate-co-methacrylic acid-co-2-cinnamoyl-oxyethyl methacrylate) (5:90:5 mol %);
Poly(3-sulfopropyl methacrylate-co-methacrylic acid-co-2-cinnamoyl-oxyethyl methacrylate) (2:78:20 mol %);
Poly(3-sulfopropyl methacrylate-co-methyl metharylate-co-2-cinnamoyl-oxyethyl methacrylate) (50:30:20 mol %);
Poly(3-sulfopropyl methacrylate-co-butyl metharylate-co-2-cinnamoyl-oxyethyl methacrylate) (50:30:20 mol %);
Poly(3-sulfopropyl methacrylate-co-styrene-co-2-cinnamoyl-oxyethyl methacrylate) (70:10:20 mol %);
Poly(3-sulfopropyl methacrylate-co-methacrylic acid-co-butyl methacrylate-co-2-cinnamoyl-oxyethyl methacrylate) (10:60:10:20 mol %);
Poly(3-sulfopropyl methacrylate-co-methacrylic acid-co-styrene-co-2-cinnamoyl-oxyethyl methacrylate) (10:65:5:20 mol %);
Poly(3-sulfopropyl methacrylate potassium salt-co-acrylamide-co-2-cinnamoyl-oxyethyl methacrylate) (50:30:20 mol %);
Poly(3-sulfopropyl methacrylate potassium salt-co-acrylamide-co-2-cinnamoyl-oxyethyl methacrylate) (10:70:20 mol %);
Poly(3-sulfopropyl methacrylate potassium salt-co-2-hydroxyethyl metacrylate-co-2-cinnamoyl-oxyethyl methacrylate) (50:30:20 mol %);
Poly(3-sulfopropyl methacrylate potassium salt-co-2-hydroxyethyl metacrylate-co-2-cinnamoyl-oxyethyl methacrylate) (10:70:20 mol %);
Poly(3-sulfopropyl methacrylate potassium salt-co-maleic anhydryde-co-2-cinnamoyl-oxyethyl methacrylate) (50:30:20 mol %);
Poly(3-sulfopropyl methacrylate potassium salt-co-maleic anhydryde-co-2-cinnamoyl-oxyethyl methacrylate) (10:70:20 mol %);
Poly(3-sulfopropyl methacrylate potassium salt-co-N-vinyl-2-pyrrolidone-co-2-cinnamoyl-oxyethyl methacrylate) (50:30:20 mol %);
Poly(3-sulfopropyl methacrylate potassium salt-co-vinyl phosphonic acid-co-2-cinnamoyl-oxyethyl methacrylate) (50:30:20 mol %);
Poly(2-acylamido-2-methyl-1-propanesulfonic acid-co-2-cinnamoyl-oxyethyl methacrylate) (80:20 mol %);
Poly(2-acylamido-2-methyl-1-propanesulfonic acid-co-methacrylic acid-co-2-cinnamoyl-oxyethyl methacrylate) (50:30:20 mol %);
Poly(2-acylamido-2-methyl-1-propanesulfonic acid-co-methacrylic acid-co-2-cinnamoyl-oxyethyl methacrylate) (10:70:20 mol %);
Poly(2-acylamido-2-methyl-1-propanesulfonic acid-co-acrylamide-co-2-cinnamoyl-oxyethyl methacrylate) (50:30:20 mol %);
Poly(2-acylamido-2-methyl-1-propanesulfonic acid-co-2-hydroxyethyl methacrylate-co-2-cinnamoyl-oxyethyl methacrylate) (50:30:20 mol %);
Poly(2-acylamido-2-methyl-1-propanesulfonic acid-co-maleic anhydryde-co-2-cinnamoyl-oxyethyl methacrylate) (50:30:20 mol %);
Poly(2-acylamido-2-methyl-1-propanesulfonic acid-co-N-vinyl-2-pyrrolidone-co-2-cinnamoyl-oxyethyl methacrylate) (50:30:20 mol %);
Poly(2-acylamido-2-methyl-1-propanesulfonic acid-co-vinyl phosphonic acid-co-2-cinnamoyl-oxyethyl methacrylate) (50:30:20 mol %);
Poly(styrene sulfonic acid sodium salt-co-2-cinnamoyl-oxyethyl methacrylate) (80:20 mol %);
Poly(styrene sulfonic acid sodium salt-co-methacrylic acid-co-2-cinnamoyl-oxyethyl methacrylate) (50:30:20 mol %);
Poly(3-sulfopropyl acrylate sodium salt-co-methacrylic acid-co-2-cinnamoyl-oxyethyl methacrylate) (50:30:20 mol %);
Poly(2-sulfoethyl methacrylate sodium salt-co-methacrylic acid-co-2-cinnamoyl-oxyethyl methacrylate) (50:30:20 mol %);
Poly(4-sulfobutyl methacrylate sodium salt-co-methacrylic acid-co-2-cinnamoyl-oxyethyl methacrylate) (50:30:20 mol %);
Poly(3-sulfopropyl methacrylate potassium salt-co-7-(2-methacryloxyethoxy)-4-methylcoumarin) (80:20 mol %);
Poly(3-sulfopropyl methacrylate potassium salt-co-methacrylic acid-co-7-(2-methacryloxyethoxy)-4-methylcoumarin) (50:30:20 mol %);
Poly(3-sulfopropyl methacrylate potassium salt-co-methacrylic acid-co-7-(2-methacryloxyethoxy)-4-methylcoumarin) (30:50:20 mol %);
Poly(3-sulfopropyl methacrylate potassium salt-co-methacrylic acid-co-7-(2-methacryloxyethoxy)-4-methylcoumarin) (10:70:20 mol %);
Poly(3-sulfopropyl methacrylate potassium salt-co-acrylic acid-co-7-(2-methacryloxyethoxy)-4-methylcoumarin) (50:30:20 mol %);

Poly(3-sulfopropyl methacrylate potassium salt-co-acrylamide-co-7-(2-methacryloxyethoxy)-4-methylcoumarin) (50:30:20 mol %);

Poly(3-sulfopropyl methacrylate potassium salt-co-2-hydroxyethyl methacrylate-co-7-(2-methacryloxyethoxy)-4-methylcoumarin) (50:30:20 mol %);

Poly(3-sulfopropyl methacrylate potassium salt-co-maleic anhydryde-co-7-(2-methacryloxyethoxy)-4-methylcoumarin) (50:30:20 mol %); Poly(3-sulfopropyl methacrylate potassium salt-co-N-vinyl-2-pyrrolidone-co-7-(2-methacryloxyethoxy)-4-methylcoumarin) (50:30:20 mol %);

Poly(3-sulfopropyl methacrylate potassium salt-co-vinyl phosphonic acid-co-7-(2-methacryloxyethoxy)-4-methylcoumarin) (50:30:20 mol %);

Poly(3-sulfopropyl methacrylate potassium salt-co-N-vinyl-2-pyrrolidone-co-methacrylic acid-co-7-(2-methacryloxyethoxy)-4-methylcoumarin) (20:30:30:20 mol %);

Poly(styrene sulfonic acid sodium salt-co-7-(2-methacryloxyethoxy)-4-methylcoumarin) (80:20 mol %);

Poly(styrene sulfonic acid sodium salt-co-methacrylic acid-co-7-(2-methacryloxyethoxy)-4-methylcoumarin) (50:30:20 mol %);

Poly(2-acylamido-2-methyl-1-propanesulfonic acid-co-7-(2-methacryloxyethoxy)-4-methylcoumarin) (80:20 mol %);

Poly(2-acylamido-2-methyl-1-propanesulfonic acid-co-methacrylic acid-co-7-(2-methacryloxyethoxy)-4-methylcoumarin) (50:30:20 mol %);

Poly(3-sulfopropyl methacrylate-co-N-(2-(methacryloxy)ethyl) dimethylmaleimide-) (80:20 mol %);

Poly(3-sulfopropyl methacrylate-co-methacrylic acid-co-N-(2-(methacryloxy)ethyl) dimethylmaleimide-) (50:30:20 mol %);

Poly(3-sulfopropyl methacrylate-co-methacrylic acid-co-N-(2-(methacryloxy)ethyl) dimethylmaleimide-) (10:70:20 mol %);

Poly(styrene sulfonic acid sodium salt-co-methacrylic acid-co-N-(2-(methacryloxy)ethyl) dimethylmaleimide-) (50:30:20 mol %);

Poly(2-acylamido-2-methyl-1-propanesulfonic acid-co-methacrylic acid-co-N-(2-(methacryloxy)ethyl) dimethylmaleimide-) (50:30:20 mol %);

Poly[3-sulfopropyl methacrylate-co-3N-(2-(methacryloxy) ethyl thymine] (80:20 mol %);

Poly[3-sulfopropyl methacrylate-co-methacrylic acid-co-3N-(2-(methacryloxy)ethyl-thymine] (50:30:20 mol %);

Poly(3-sulfopropyl methacrylate sodium salt-co-methacrylic acid-co-2-(2,3-diphenyl-2-cyclopropene-1-carbonyloxy) ethyl methacrylate) (50:30:20 mol %);

Poly(3-sulfopropyl methacrylate sodium salt-co-methacrylic acid-co-2-(2,3-diphenyl-2-cyclopropene-1-carbonyloxy) ethyl methacrylate) (10:70:20 mol %);

Poly(2-acrylamido-2-methyl-1-propanesulfonic acid-co-methacrylic acid-co-2-(2,3-diphenyl-2-cyclopropene-1-carbonyloxy) ethyl methacrylate) (10:70:20 mol %);

Poly(styrene sulfonic acid sodium salt-co-methacrylic acid-co-2-(2,3-diphenyl-2-cyclopropene-1-carbonyloxy) ethyl methacrylate) (10:70:20 mol %);

Poly[3-sulfopropyl methacrylate-co-1-methyl-4-[2-(4-(2-methacryloxyethyl)-carbonyloxyphenyl)ethenyl]pyridinium trifluoromethylsulfonate] (80:20 mol %);

Poly[3-sulfopropyl methacrylate-co-methacrylic acid-co-1-methyl-4-[2-(4-(2-methacryloxyethyl)-carbonyloxyphenyl)ethenyl]pyridinium trifluoromethylsulfonate] (10:70:20 mol %);

Poly[3-sulfopropyl methacrylate-co-methacrylic acid-co-1-methyl-4-[2-(4-(2-methacryloxyethyl)-carbonyloxyphenyl)ethenyl]quinolinium trifluoromethylsulfonate] (30:50:20 mol %);

Poly[3-sulfopropyl methacrylate-co-methacrylic acid-co-1-methyl-2-[2-(4-(2-methacryloxyethyl)-carbonyloxyphenyl)ethenyl]thiazolium trifluoromethylsulfonate-co-methacrylic acid] (20:60:20 mol %);

Poly[styrene sulfonic acid-co-methacrylic acid-co-1-methyl-4-[2-(4-(2-methacryloxyethyl)-carbonyloxyphenyl)ethenyl]pyridine] (50:30:20 mol %); and Poly[styrene sulfonic acid sodium salt-co-2-(4-(2-methacryloxyethyl)-carbonyloxyphenyl)ethenyl]phenyl] (80:20 mol %).

The reactive polymers useful in the invention generally have a molecular weight ($M_w$) of at least 10,000 and up to and including 1,000,000, or at least 20,000 and up to and including 500,000, or even at least 30,000 and up to and including 200,000, all as measured by gel permeation chromatography (GPC) or by size exclusion chromatography (SEC).

Preparation of the reactive polymers useful in the present invention can be accomplished by free radical initiated polymerization in the appropriate reaction solvent combination. The proper choice of reaction solvents is desirable for successful polymerization because of the wide disparity in polarity between the various ethylenically unsaturated polymerizable monomers with the ethylenically unsaturated polymerizable monomers providing the (a) recurring units being very polar or negatively charged and water soluble and the ethylenically unsaturated polymerizable monomers that provide (b) recurring units being relatively non-polar and hydrophobic. It is typical to require up to three reaction solvents in combination to facilitate a well-controlled polymerization. Useful reaction solvents include but are not limited to, water, ketones such as methyl ethyl ketone, aprotic polar solvents such as N,N-dimethylacetamide, and alcohols such as isopropyl alcohol. Readily available free radical initiators such as 2,2'-azodi(2-methylbutyronitrile) (AMBN) or azobis(isobutyronitrile) (AIBN) generally work well in these preparations of the reaction polymers. The polymerization reaction is typically carried out at 60° C. to 75° C. for about 18 hours. Controlled or living radical polymerization methods (see for example, Qui et al., *Progress in Polymer Science* 26 (2001) 2083-2134) that can produce very narrow molecular weight distributions and highly controlled block copolymers could also be used.

Purification of useful reactive polymers is best accomplished by dialysis because of their high water solubility. Additional water can be added to the completed reaction mixture that is then placed in a dialysis bag with a typical retention of polymer chains with an $M_w$ of 3500 Daltons or more. The dialysis bag containing the crude reactive polymer is placed in a water washing bath for 1 to 2 days or longer if needed. After dialysis, the dilute reactive polymer solution can be concentrated by evaporation to from 10 weight % to 20 weight % solids which is suitable for storage and dilution to desired coating concentrations.

One or more reactive polymers described herein can be present in the ink jettable and UV-curable compositions described herein in an amount of at least 0.1 weight % and up to and including 20 weight %, or at least 1 weight % and up to and including 10 weight %, based on the total weight of the ink jettable and UV-curable composition (including the aqueous medium such as water).

One or more of such reactive polymers can then be dispersed in an acceptable aqueous medium that comprises mostly (at least 70 weight % of total aqueous medium) water, or entirely (100%) water, to form ink jettable and UV-curable compositions of the present invention.

In many embodiments, the reactive polymers described herein can be combined with one or more humectants to form ink jettable and UV-curable compositions of the present invention.

Such humectants are generally water-soluble or water-miscible organic solvents (sometimes known as co-solvents) having a viscosity that is greater than 40 centipoise or even at least 1000 centipoise when measured at 25° C. For example, any water-soluble humectant known in the ink jet art that is compatible with the reactive polymer can be used. By "water-soluble" is meant that a mixture of the humectant(s) and water is homogeneous and visually clear. While an individual humectant can be employed, mixtures of two or more humectants, each of which imparts a useful property also can be used. Representative examples of useful humectants include but are not limited to the following compounds:

(1) polyhydric alcohols (polyols), such as ethylene glycol, diethylene glycol, triethylene glycol, tetraethylene glycol, propylene glycol, dipropyleneglycol, the polyethylene glycols with average molecular weights of at least 200 to and including 5000 Daltons, the polypropylene glycols with average molecular weights of at least 200 to and including 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols and thioglycol;

(2) polyoxygenated polyols and their derivatives such as diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives;

(3) sulfur-containing compounds such as 2,2'-thiodiethanol and other sulfonated diols;

(4) cyclic lactams such as pyrrolidinones including as 2-pyrrolidinone, N-hydroxyethyl-2-pyrrolidinone, and N-methyl 2-pyrrolidinone; and (5) cyclic ureas such as imidazolidones including 2-imidazolidone and 1,3-dimethyl-2-imidazolidone.

Of these compounds, ethylene glycol and 2-pyrrolidone are particularly useful. Glycerol and polyhydric alcohol derivatives thereof are also useful and can be combined with lower viscosity humectants such as ethylene glycol or 2-pyrrolidone. The useful humectants have melting points below the typical operating temperature of the intended printer system to avoid the formation of crystalline deposits on the print head or in the maintenance system. Practically, this means that the useful humectants have melting points below 30° C. or even below 20° C.

The one or more humectants can be present in an amount of at least 0.1 weight %, or of at least 1 weight % and up to and including 30 weight %, or of at least 1 weight % and up to and including 20 weight %, all based on the total weight of the ink jettable and UV-curable composition (including water).

Besides the essential reactive polymer described above and any humectants described above, the ink jettable and UV-curable compositions can further comprise one or more of the following optional components that may provide manufacturability, ink jetting, or image properties.

For example, one or more dye or pigment colorants can be present. In general, such colorants are water-soluble or at least water-dispersible so that they do not adversely affect ink jetting of the ink jettable and UV-curable compositions. Such dye or pigment colorants can provide any desired color or hue, and they can be used as mixtures to adjust hues or colors from the hues or colors that would be provided by each individual dye or pigment colorant.

Useful pigment colorants include but are not limited to, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, quinacridone pigments, polycyclic pigments, phthalocyanine pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium dioxide, iron oxide, and carbon blacks. Specific useful pigment colorants are described in Col. 10 (lines 66) to Col. 11 (line 40) of U.S. Pat. No. 8,455,570 (Lindstrom et al.), the disclosure of which is incorporated herein by reference.

Useful organic compounds that are water-soluble or water-dispersible dye colorants include but are not limited to, Food Black 1, Food Black 2, Food Black 40, Carta Black, Direct Black dyes (4, 14, 17, 22, 27, 38, 51, 112, 117, 154, and 168), carboxylated Food Black 286, Acid Black dyes (1, 7, 9, 24, 26, 48, 52, 58, 60, 61, 63, 92, 107, 109, 118, 119, 131, 140, 155, 156, 172, and 194), Acid Red dyes (1, 8, 32, 35, 37, 52, 57, 92, 115, 119, 154, 249, 254, and 256), Food Red 40, Direct Red dyes (1, 2, 16, 23, 24, 28, 39, 62, 72, 227, and 236), Direct Red 227, Food Yellow 7, Acid Yellow dyes (3, 7, 17, 19, 23, 25, 29, 38, 42, 49, 59, 61, 72, 73, 114, 128, and 151), Direct Yellow dyes (4, 11, 12, 27, 28, 33, 34, 39, 50, 58, 86, 100, 106, 107, 118, 127, 132, 142, and 157), Food Blue 1, Acid Blue dyes (1, 7, 9, 25, 40, 45, 62, 78, 80, 92, 102, 104, 113, 117, 127, 158, 175, 183, 185, 193, and 209), Direct Blue dyes (1, 6, 8, 14, 15, 25, 71, 76, 78, 80, 86, 90, 106, 108, 123, 163, 165, 199, and 226), Direct Blue 199, FD&C Blue 1, Acid Orange 7, and others that are known in the art and available from various commercial sources, including those listed in Col. 9 (line 8) to Col. 10 (line 5) of U.S. Pat. No. 6,124,376 (Nichols et al.) which disclosure is incorporated herein by reference and in Col. 2 (line 65) to Col. 3 (line 23) which disclosure is also incorporated herein by reference. Any anionic dyes can be supplied with suitable counterion(s) such as sodium, lithium, quaternary ammonium, or triethanol amine counterions.

A wide variety of water-dispersible organic and inorganic pigments can be used individually or in combination. For example, a carbon black pigment can be used alone or combined with a colored pigment such as a cyan copper phthalocyanine or a magenta quinacridine pigment. Useful pigments are described for example in U.S. Pat. No. 5,026,427 (Mitchell et al.), U.S. Pat. No. 5,141,556 (Matrick), U.S. Pat. No. 5,160,370 (Suga et al.), and U.S. Pat. No. 5,169,436 (Matrick), the disclosures of all of which are incorporated herein by reference.

The useful pigment colorants can be accompanied by suitable polymeric or non-polymeric dispersants that are well known in the art, or the pigment colorants can be self-dispersing and thus separate dispersible and stable in the ink jettable and UV-curable compositions without the use of dispersants because of the presence of appropriate surface groups. Examples of useful self-dispersing pigment colorants are described in Col. 11 (lines 49-53) of U.S. Pat. No. 8,455,570 (noted above).

Useful pigment colorants can have a median particle diameter of less than 150 nm and more likely less than 100 nm or even less than 50 nm. As useful herein, the term "median particle diameter" refers to the 50$^{th}$ percentile of the classified particle size distribution such that 50% of the volume of the particles is provided by particles having diameters smaller than the indicated diameter.

Dye or pigment colorants can be present in each ink jettable and UV-curable composition in an amount of at least 0.1 weight % and up to and including 30 weight %, or more likely of at least 0.2 weight % and up to and including 10 weight %, or even of at least 0.5 weight % and up to and including 8 weight %, based on the total weight of the ink jettable and UV-curable composition (including water).

Other optional additives that can be present in the ink jettable and UV-curable compositions, in amounts that would be readily apparent to one skilled in the art, include but are not limited to, thickeners; conductivity-enhancing agents; drying agents; waterfast agents; viscosity modifiers; pH buffers; antifoamants; wetting agents; corrosion inhibitors; biocides (such as Kordek and Proxel); fungicides; defoamers (such as SURFYNOL® DF110L, PC, MD-20, and DF-70); non-silicone surfactants (anionic or nonionic) such as SURFYNOL® (Air Products) surfactants including SURFYNOL® 440 and 465 surfactants, TERGITOL® surfactants (Union Carbide), and various fluorinated surfactants available from DuPont such as CAPSTONE® FS-35 fluorinated surfactant; light stabilizers available under the trademarks TINUVIN® (Ciba) and IRGANOX® (Ciba); as well as other additives described in Col. 17 (lines 11-36) of U.S. Pat. No. 8,455,570 (noted above). Examples of useful non-silicone surfactants are also described in [0065]-[0066] of U.S. Patent Application Publication 2008/0207811 (noted above).

While not essential, it is sometimes desirable to enhance the sensitivity of some reactive polymers to longer wavelengths (for example, at least 250 nm and up to and including 700 nm, or at least 250 nm and up to and including 450 nm) by including one or more photosensitizers including triplet state photosensitizers. A variety of photosensitizers are known in the art such as benzothiazole and naphthothiazole compounds as described in U.S. Pat. No. 2,732,301 (Robertson et al.), aromatic ketones as described in U.S. Pat. No. 4,507,497 (Reilly, Jr.), and ketocoumarins, as described for example in U.S. Pat. No. 4,147,552 (Specht et al.) and U.S. Pat. No. 5,455,143 (Ali), the disclosures of all of which are incorporated herein by reference. Particularly useful photosensitizers for long UV and visible light sensitivity include but are not limited to, 2-[bis(2-furoyl)methylene]-1-methyl-naphtho[1,2-d]thiazoline, 2-benzoylmethylene-1-methyl-3-naphthothiazoline, 3,3'-carbonylbis(5,7-diethoxycoumarin), 3-(7-methoxy-3-coumarinoyl)-1-methylpyridinium fluorosulfate, 3-(7-methoxy-3-coumarinoyl)-1-methylpyridinium 4-toluenesulfonic acid, and 3-(7-methoxy-3-coumarinoyl)-1-methylpyridinium tetrafluoroborate. Other useful compounds are described in Columns 6 and 7 of U.S. Pat. No. 4,147,552 (noted above) which compound disclosure is incorporated herein by reference. Thioxanthones are also particularly useful for sensitizing the type (iv) [2+2] photo-cycloaddition groups such as dimethylmaleimide.

One or more photosensitizers can be present in an ink jettable and UV-curable composition in an amount of at least 0.1 weight % and up to and including 5 weight %, or more likely at least 0.5 weight % and up to and including 2 weight %, based on the total weight of the ink jettable and UV-curable composition.

It is also possible to include one or more anionic polyether polyurethanes in the ink jettable and UV-curable compositions of this invention. Such materials are condensation polymers prepared using suitable compounds ("monomers") having at least two hydroxyl groups (for example, diols or triols) and compounds ("monomers") having at least two isocyanates groups (such as diisocyanates and triisocyanates), which condensation polymers have suitable acidic groups to provide the desired acid number of the resulting polymer. The acidic groups are desirably carboxylic acid groups but any type of acidic group can be used if desired. Suitable compounds having sufficient hydroxyl groups and compounds having sufficient isocyanate groups are well known in the art, and any of these compounds can be substituted with one or more suitable acidic groups such as carboxylic acid groups. Not all of such compounds, however, need be substituted with the anionic groups. Such anionic polyether polyurethanes are therefore generally dispersible within the aqueous colorless ink jet ink compositions without the need for separate dispersing agents ("dispersants").

The useful anionic polyether polyurethanes can also comprise recurring units derived from monomers that do not contain acidic groups but can have multiple hydroxyl groups are often known as polyol or polyhydroxyl derivatives of polyethers.

The anionic polyether polyurethanes generally can have a molecular weight ($M_w$) of at least 10,000 Daltons and up to and including 30,000 Daltons or at least 15,000 Daltons and up to and including 25,000 Daltons.

For example, particularly useful polyether polyurethanes are individually represented by the following Structure (I):

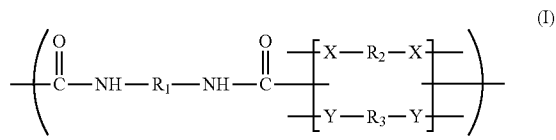

wherein $R_1$ is the central portion of recurring units derived from a polyisocyanate, $R_2$ represents a recurring unit derived from a polyether and having a molecular weight of at least 250 and up to and including 2900, $R_3$ represents a central portion of a recurring unit containing an acidic group, and X and Y can be the same or different and are oxygen or nitrogen as long as at least one of X and Y is oxygen.

For example, $R_1$ can be a divalent, substituted or unsubstituted hydrocarbon group including divalent hydrocarbon groups comprising 1 to 20 carbon atoms in the chain and one or more unsubstituted or substituted alicyclic, aliphatic, or aromatic groups, for example, such divalent groups as substituted or unsubstituted 1,4-arylene-methylene-1,4-arylene, substituted or unsubstituted 1,4-cyclohexylene-methylene-1,4-cyclohexylene, substituted or unsubstituted n-hexylene, and substituted or unsubstituted 5-methyl-4,4-dimethyl-2,5-hexylene-methylene.

In Structure (I), $R_2$ can be a prepolymer comprising ethylene oxide, propylene oxide, tetramethylene oxide, or a mixture thereof that can be introduced into the polyurethane using any suitable polyol. For example, the polyether segment can be introduced into the polyurethane backbone by using a prepolymer with both ends terminated with a hydroxyl (diol) or an amino (diamine) group. Such prepolymers are known as polyols and polyamines. Useful polyether diols and diamines are sold under the tradenames TERATHANE® (Dupont) and JEFFAMINE®, for example the D, ED, and M series (Huntsman). Another useful polyether diamine is a polytetrahydrofuran bis(3-aminopropyl) terminated having a molecular weight of about 1,000. Mixtures of these various reactants can be used if desired.

In Structure (I), $R_3$ can be obtained from polyols comprising phospho, carboxy, or sulfo groups, or a mixture of such groups. Polyols comprising carboxy groups include but are not limited to, 2,2'-bis(hydroxymethyl)propionic acid, 2,2'-bis(hydroxymethyl)butanoic acid, and hydroxyether of 2,4'-bis(1-hydroxyphenyl)valeric acid. Mixtures of these polyols can be used if desired.

Useful water-soluble or water-dispersible anionic polyether polyurethanes can be prepared by preparing prepolymers having a relatively low molecular weight and small excess of isocyanate groups and chain-extending with a chain extender the prepolymers into high molecular weight polyurethane during the dispersion process. More details about the manufacturing process are described for example in [0045]-[0049] of U.S. Patent Application Publication 2008/0207811 (noted above) the disclosure of which is incorporated herein by reference.

The acidic groups in the anionic polyether polyurethanes useful in this invention can be at least partially neutralized (converted into salts) using monovalent inorganic bases such as alkaline metal hydroxides. Up to 100% of the acid groups can be so neutralized.

Anionic acrylic polymers and anionic styrene-acrylic polymers can also be included within the ink jettable and UV-curable compositions of the present invention are generally water-soluble or water-dispersible due to the presence of anionic groups distributed throughout the polymeric backbone. Such water-solubilizing anionic groups can include sulfonic acids and carboxylic acids. The term "water-soluble" is meant herein that when the anionic acrylic polymer or anionic styrene-acrylic polymer is dissolved in water and when such polymer is at least partially neutralized with an inorganic monovalent base, the resultant solution is visually clear.

Ethylenically unsaturated polymerizable monomers ("monomers") useful for making useful anionic acrylic polymers include but are not limited to, methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, butadiene, isoprene, N,N-dimethyl acrylamide, acrylic acid, methacrylic acid, chloromethacrylic acid, maleic acid, and derivatives thereof. Other useful ethylenically unsaturated polymerizable monomers include allyl compounds such as allyl esters, vinyl ethers, vinyl esters, vinyl heterocyclic compounds, sodium styrene sulfonate, crotonic acids, vinyl ketones, olefins, itaconic acids and esters, and many other compounds that are described in [0055] of U.S. Patent Application Publication 2008/0207811 (noted above) and the disclosure of which is incorporated herein by reference. The anionic acrylic polymers can comprise recurring units derived from the one or more of the noted monomers that are arranged in blocks or in random fashion along the polymer backbone.

The anionic styrene-acrylic polymers can be derived from at least one or more acrylic monomers (as described above) and at least one or more styrene monomers (including styrene and derivatives thereof) and optionally others that would be readily apparent to one skilled in the art. Such anionic styrene-acrylic polymers can include blocks of the same recurring units or have randomly occurring recurring units, derived from the various ethylenically unsaturated polymerizable monomers.

The water-soluble or water-dispersible anionic acrylic polymers and styrene-acrylic polymers can have a weight average molecular weight ($M_w$) of at least 1,000 Daltons up to and including 100,000 Daltons or typically of at least 1,000 Daltons and up to and including 50,000 Daltons. In some embodiments, the molecular weight can be at least 1500 Daltons and up to and including 20,000 Daltons. In some other embodiments, mixtures of anionic acrylic polymers and styrene-acrylic polymers can be used in which at least one anionic acrylic polymer or anionic styrene-acrylic polymer has a molecular weight of less than or equal to 10,000 Daltons and at least one other anionic acrylic polymer or anionic styrene-acrylic polymer has a molecular weight greater than 10,000 Daltons.

The anionic acrylic polymers and anionic styrene-acrylic polymers can be prepared using emulsion polymerization, solution polymerization, or bulk polymerization techniques that are well known in the art. In addition, the acidic groups in such polymers can be at least partially neutralized in a manner like neutralization of the anionic polyether polyurethanes described above. Moreover, inorganic bases are desirable over organic bases such as amines as neutralizing agents.

Representative anionic acrylic polymers and anionic styrene-acrylic polymers useful in the present invention are described in U.S. Pat. No. 6,866,379 (Yau et al.), the disclosure of which is incorporated herein by reference. Such anionic polymers can be derived from at least one (meth)acrylic acid ester, with or without one or more styrenes. Any of these monomers can be substituted with suitable acidic groups such as carboxylic acid groups. Useful anionic polymers are described for example in [0061] of U.S. Patent Application Publication 2008/207811 (noted above) the disclosure of which is incorporated herein by reference.

Examples of useful anionic styrene-acrylic polymers include those commercially available under the trademarks JONCRYL® (S.C. Johnson Co.), TRUDOT® (Mead Westvaco Co.), and VANCRYL® (Air Products and Chemicals, Co.).

An aqueous medium such as water is generally present in the ink jettable and UV-curable compositions in an amount of at least 75 weight % or of at least 85 weight %, and generally no more than 95 weight %, based on the total weight of the ink jettable and UV-curable composition.

The pH of the ink jettable and UV-curable compositions of this invention can be adjusted if desired to at least 6 and up to and including 12, or more likely of at least 6 and up to and including 10, or in some embodiments of at least 6 and up to and including 9.5. The pH can be achieved using any suitable base such as an alkali metal hydroxide or an organic amine in a suitable amount. Alkali metal hydroxides are known to provide improved ink jetting performance in thermal ejector print heads. Buffers can be included to maintain the desired pH and such materials would be readily apparent to one skilled in the art, including those described in Cols. 17-19 of U.S. Pat. No. 8,455,570 (noted above).

Metal-Containing Compositions

The ink jettable and UV-curable compositions described above can be converted to corresponding metal-containing compositions described below that are also ink jettable and UV-curable compositions. Such metal-containing compositions can be incorporated into the various articles described below or used in various methods as described below.

Each metal-containing composition described herein has these essential components: one or more reactive polymers (or crosslinked reacted polymers) as described above that are complexed with either reducible metal ions or reduced metal nanoparticles, and an optional components as described above. The reactive polymers can be used to form crosslinked reacted polymers (thus rendered water-insoluble) upon exposure to radiation having $\lambda_{max}$ of at least 150 nm and up to and including 700 nm, or of at least 250 nm and up to and including 450 nm, as described below. While various other optional components can be included as described above, only the complex of reactive polymer and either reducible metal ions or metal nanoparticles are essential for providing the desired compositions, articles, and methods.

Useful reducible metals or metal nanoparticles can be composed of for example, silver, copper, palladium, platinum, gold, nickel or tin metals. Particularly useful metals are silver, copper, and palladium.

Several embodiments of metal-containing compositions are described as follows.

Metal-Containing Composition (A):

In one embodiment, a water-soluble, metal-containing ink jettable and UV-curable composition comprises a water-soluble complex of a reactive polymer (as described above) with reducible metal ions, and optionally but desirably a humectant or other optional components described above. Such a metal-containing composition can also be considered a "metal precursor" composition that eventually can be used to provide metal nanoparticles within a polymeric complex.

One or more complexes of reactive polymers and reducible metal ions as described herein are generally present in metal-containing composition (A) (and in a resulting dry layer) in an amount of at least 10 weight % and up to and including 99 weight %, or typically at least 50 weight % and up to and including 90 weight %, based on the total solids in metal-containing composition (A). If present, the amount of one or more optional components can be determined from the teaching concerning amounts shown above.

The water-soluble complexes of metal ions (non-reduced elemental metal) and reactive polymers for metal-containing composition (A) can be prepared by adding a water-soluble metal salt that would be readily apparent to one skilled in the art. For example, reducible silver ions can be provided by adding silver nitrate or silver acetate to an aqueous solution of a reactive polymer with stirring and for example, using controlled addition rates. Useful copper salts would also be similarly useful to provide complexes with reducible copper ions. Reducible palladium ions can be added as a water-soluble palladium chloride complex with acetonitrile. The reducible metal ions will tend to bind with the sulfonate or sulfonic acid groups and optional carboxylic acid or carboxylate sites in the reactive polymer forming a metal-containing polymer complex or salt that is less soluble and more stable than the original metal salt but is still soluble in water. This metal-containing composition (A) containing unreduced form of the metal polymer complex can be printed onto a suitable substrate and hardened or patterned using ultraviolet radiation. The reducible metal ions (for example reducible silver ions) in the ink solution or UV-cured printed images can be reduced to form metal nanoparticles (for example silver nanoparticles) by contact (such as immersion) with a reducing agent as described below, or for some metals such as silver, simply by exposure to UV or visible radiation and heat that can cause poor long-term stability. Oxidants such as iodate salts can be added to the formulation to reduce or eliminate the formation of reduced metal (such as reduced silver) due to ambient light and heat.

In the case of some metals such as silver and gold, the spontaneous formation of reduced metal nanoparticles using a reducing agent is observable because of the appearance of a strong color in the visible region of the electromagnetic spectrum due to the surface plasmon resonance of the reduced metal nanoparticles in the resulting water-insoluble complex.

Metal-Containing Composition (B):

In another embodiment, a metal-containing ink jettable and UV-curable composition comprises a water-soluble complex of a reactive polymer (as described above) with metal nanoparticles (such as silver nanoparticles), and optionally but desirably a humectant or other optional components. Such metal-containing ink jettable and UV-curable compositions can be readily obtained, for example, by reducing the reducible metal ions in a metal-containing composition (A) described above. For example, this metal-containing ink jettable and UV-curable composition can be obtained, for example, by reducing the silver ions in a water-soluble, silver-containing composition (A) described above.

One or more complexes of reactive polymers and metal nanoparticles as described herein are generally present in metal-containing composition (B) (and in a resulting dry layer) in an amount of at least 10 weight % and up to and including 99 weight %, or typically at least 50 weight % and up to and including 90 weight %, based on the total solids in metal-containing composition (B).

As noted above, the water-soluble complexes of metal nanoparticles (such as silver nanoparticles) and reactive polymers for metal-containing composition (B) can be prepared by reducing the metal ions in metal-containing composition (A) containing the same reactive polymer. For example, starting with a metal-containing composition (A), the rapid formation of a complex of reactive polymer and metal nanoparticles is easily accomplished by the careful addition of a metal ion reducing agent, for example a silver ion reducing agent such as dimethylamine borane (DMAB) that is especially well suited to work at the inherent low pH of the polymer solutions. Other silver ion reducing agents are borohydrides (for example, sodium borohydride), hydrazine, hypophosphite (such as sodium hypophosphite), amines (such as tetramethylethylenediamine), aldehydes, and sugars that can be used for this purpose if the pH of the composition is properly adjusted.

Depending on the composition of the reactive polymer and formulation conditions for certain embodiments, metal nanoparticles having an average diameter of at least 2 nm and up to and including 500 nm, or at least 5 nm and up to and including 300 nm can be formed and stably dispersed and complexed within the reactive polymer such that they can be filtered without removing the metal nanoparticles and the metal-containing composition (B) can be coated without forming particulate defects. The resulting complex of reactive polymer and metal nanoparticles can be strongly colored, especially for small particles with a narrow size distribution due to the strong surface plasmon resonance effect. The complex of reactive polymer and metal nanoparticles can again be dialyzed if necessary to remove any reaction products or salts produced as by-products during the formation of the complex.

Alternatively, metal-containing composition (B) can be prepared by mixing metal nanoparticles from any commercial source to an aqueous solution of a reactive polymer with stirring until complexation occurs, and optionally including a humectant. The metal nanoparticles will tend to bind with the sulfonate or sulfonic acid groups and optional carboxylic acid or carboxylate sites in the reactive polymer forming a metal nanoparticle-polymer complex.

Metal-Containing Composition (C):

Yet another useful embodiment comprises a crosslinked water-insoluble metal-containing composition of a crosslinked reacted polymer with reducible metal ions and optionally but desirably optional components such as a humectant. Such crosslinked reacted polymer can be derived from suitable photoexposure of an ink jettable UV-curable composition comprising a reactive polymer (as described above) that is complexed with reducible metal ions. Such metal-containing composition can be obtained, for example, by photoexposure of water-soluble, metal-containing composition (A) described above but before any appreciable metal ion reduction occurs. Alternatively, one can crosslink a reactive polymer as described herein in an ink jettable and UV-curable composition and then imbibe or diffuse metal ions into it for complexation with the sulfonic acid and any carboxylic acid groups in the reacted polymer.

Metal-Containing Composition (D):

Still another useful embodiment comprises a crosslinked metal-containing composition comprising a crosslinked water-insoluble complex of a crosslinked reacted polymer with metal nanoparticles and optionally but desirably including optional components such as a humectant. Such crosslinked reacted polymer can be derived from photoexposure as described herein of an ink jettable and UV-curable composition comprising a reactive polymer (as described above) that is already complexed with metal nanoparticles (such as silver nanoparticles) from appropriate reduction of reducible metal ions. This crosslinked composition can be derived for example, by photoexposure of metal-containing ink jettable and UV-curable composition (B) described above; by both photoexposure and metal ion reduction, in any order, of composition (A) described above; or by metal ion reduction of metal-containing composition (C) described above.

In some embodiments, the resulting metal nanoparticles (such as silver nanoparticles) can have an average diameter of at least 2 nm and up to and including 500 nm, or at least 6 nm and up to and including 300 nm such that they can be formed and stably dispersed and complexed within the reactive polymer so that they can be filtered without removing the metal nanoparticles and the metal-containing composition (D) can be coated without forming particulate defects.

Alternatively, one can diffuse a non-complexed solution of metal nanoparticles such as silver nanoparticles into the crosslinked reactive polymer where the silver nanoparticles will preferentially bind or complex with the sulfonic acid, carboxylic acid, or other groups.

Metal-containing compositions (A) through (D) generally do not include separate crosslinking agents or crosslinking agent precursors because the reactive polymer itself includes sufficient crosslinkable groups (described above). However, as noted above, if present, the (d) recurring units can also include additional crosslinking groups.

The essential complexes of reactive polymer and either reducible metal ions or metal nanoparticles and any optional components described above, are generally dissolved or dispersed in an aqueous medium such as water or a mixture of water and water-miscible organic solvents to form a metal-containing, ink jettable and UV-curable composition that can be applied to a suitable substrate (described below) using suitable ink jetting processes and equipment. Useful water-miscible organic solvents include but are not limited to, alcohols such as methanol, ethanol, and isopropanol and polyols such as ethylene glycol, propylene glycol, and glycerol. The amounts of the complexes and any optional compounds in the various ink jettable and UV-curable compositions can be readily determined by a skilled artisan for desired use for ink jetting.

Inventive Articles

The ink jettable and UV-curable compositions and metal-containing compositions of the present invention can be used to prepare a variety of articles that can be used for various purposes as described above, for example for antimicrobial purposes as well as for preparing electrically-conductive elements (or articles).

In all of these articles, an ink jettable and UV-curable composition can be disposed in a suitable ink jetting process onto one or multiple surfaces of a suitable substrate. Some useful ink jetting processes and equipment are described below.

Useful substrates can be chosen for a particular use or method as long as the substrate material will not be degraded by the ink jettable and UV-curable composition or any treatments to which the resulting articles are subjected during the method described below. The ink jettable and UV-curable composition can be applied multiple times if desired to obtain a thicker coating, and dried between each coating or dried only after the last application. Water and any water-miscible organic solvents can be removed from the ink jettable and UV-curable composition using any suitable drying technique.

In general, the final dry image of an ink jettable and UV-curable composition can have an average dry thickness of at least 10 nm and up to and including 1 mm, with a dry thickness of at least 0.1 µm and up to and including 100 µm being useful for various uses. Such images can be uniformly applied on a substrate surface or applied in a suitable patternwise fashion as described below.

Useful substrates can be composed of glass, quartz, and ceramics as well as a wide variety of flexible materials such as cellulosic papers and polymeric films composed of polyesters including poly(ethylene terephthalate) and poly(ethylene naphthalate), polycarbonates, polyamides, polyimides, poly(meth)acrylates, or polyolefins. Useful polymeric substrates can be formed by casting or extrusion methods. Laminates of various substrate materials can also be put together to form a composite substrate. Any of the substrates can be treated to improve adhesion using for example corona discharge, oxygen plasma, ozone or chemical treatments using silane compounds such as aminopropyltriethoxysilane. The substrates can be of any suitable dry thickness including but not limited to at least 10 µm and up to and including 10 mm, depending upon the intended use of the resulting articles.

Particularly useful substrates are flexible substrates that are composed of poly(ethylene terephthalate) such as biaxially oriented poly(ethylene terephthalate) (PET) films. These PET films, ranging in dry thickness of at least 50 µm and up to and including 200 µm, can also comprise, on at least one supporting side, a polymeric primer layer (also known as a subbing layer, adhesive layer, or binder layer) that can be added prior to or after film stretching. Such polymeric primer layers can comprise poly(acrylonitrile-co-vinylidene chloride-co-acrylic acid), poly(methyl acrylate-co-vinylidene chloride-co-itaconic acid), poly(glycidyl methacrylate-co-butyl acrylate), or various water-dispersible polyesters, water-dispersible polyurethanes, or water-dispersible polyacrylics, as well as sub-micrometer silica particles. The dry thickness of the primer layer can be at least 0.1 µm and up to and including 1 µm.

In many embodiments of the present invention, each of the substrates can have an integrated transmittance of at least 80%, or at least 90% or even higher to provide articles that have excellent transparency. Such highly transparent substrates can be composed of glass (such as flexible glass) or flexible polymeric films as described above.

The useful substrates can be in any suitable shape or size. They can be in the form of sheets, films, tubes, particles, or various 3-dimensional shapes depending upon the intended use. Some particularly useful substrates are in the form of continuous flexible webs or films that can be unrolled from a stock roll, ink jet printed to apply an ink jettable and UV-curable composition followed by other treatments and then rolled up for shipment or later use in roll-to-roll manufacturing processes.

If a substrate is in the form of a sheet or roll, it typically has two opposing planar surfaces known herein as a "first supporting surface" and an "opposing second supporting surface". An ink jettable and UV-curable composition can be ink jetted onto one or both supporting surfaces of the substrate such as only on the first supporting side, or the same or different ink jettable and UV-curable composition (such as a silver or copper-containing ink jettable and UV-curable composition) can be disposed on both the first supporting surface and the opposing second supporting surface of the substrate.

In some embodiments, a precursor article can be prepared with a substrate and having an ink jettable and UV-curable composition [for example metal-containing composition (A) as described above] ink jet printed onto the substrate, for example on one or both supporting surfaces of a sheet or continuous flexible web. In some embodiments, such precursor composition can comprise a water-soluble complex of a reactive polymer (as described above) with reducible silver ions and optional components described below.

In other embodiments, a precursor metal ion-containing article can comprise a substrate and have ink jet printed thereon (for example, in a patternwise fashion) a water-insoluble (crosslinked) metal-containing composition [for example, metal-containing composition (D) as described above], comprising a crosslinked water-insoluble complex of a crosslinked reacted polymer with reducible metal ions, and optional components. Such crosslinked reacted polymer can be derived by photoexposure of a reactive polymer as described above. Such water-insoluble (crosslinked) metal-containing composition can be ink jet printed onto only the first supporting surface of the substrate, but in other embodiments, the same or different water-insoluble complex can be ink jet printed onto both the first supporting surface and the opposing second supporting surface of the substrate. In still other embodiments, the same or different water-insoluble (crosslinked) metal-containing composition is ink jet printed onto both the first supporting surface and the opposing second supporting surface of the substrate in the same or different patternwise fashion (using means described below).

It is also possible to prepare precursor metal-containing articles that comprise a substrate and having ink jet printed thereon a water-soluble metal-containing composition [for example, a silver-containing composition (B) described above] comprising a water-soluble complex of a reactive polymer (described above) with metal nanoparticles and optionally a humectant. Such water-soluble metal-containing composition can be ink jet printed on only the first supporting surface of the substrate, but in other embodiments, the same or different water-soluble complex can be ink jet printed on both the first supporting surface and the opposing second supporting surface of the substrate. In still other embodiments, the same or different water-soluble complex is ink jet printed on both the first supporting surface and the opposing second supporting surface of the substrate in the same or different patternwise fashion. Such precursor metal-containing articles can also comprise a suitable photosensitizer (as described above) admixed with the water-soluble complex and optional components.

In still other embodiments, a metal-containing article can comprise a substrate and having ink jet printed thereon a water-insoluble metal-containing composition [for example, a silver-containing composition (C) described above] comprising a crosslinked water-insoluble complex of a crosslinked reacted polymer with metal nanoparticles. This crosslinked reacted polymer can be derived from photoexposure of a reactive polymer as described above. Such water-insoluble (crosslinked) metal-containing composition can be ink jet printed onto only the first supporting surface of the substrate, but in other embodiments, the same or different water-insoluble complex can be ink jet printed on both the first supporting surface and the opposing second supporting surface of the substrate. In still other embodiments, the same or different water-insoluble (crosslinked) metal-containing composition is ink jet printed onto both the first supporting surface and the opposing second supporting surface of the substrate in the same or different patternwise fashion (using means described below).

As prepared using conditions described in more detail below, the metal-containing article can further comprise an electrically-conductive metal that has been electrolessly plated on the same or different crosslinked water-insoluble complex ink jet printed on both the first supporting surface and the opposing second supporting surface of the substrate. This electrically-conductive metal is typically electrolessly plated on the crosslinked water-insoluble complex in which the metal nanoparticles (such as silver or palladium nanoparticles) serve as catalyst seed metal particles. For example, the electrolessly plated metal can be copper, silver, gold, platinum, palladium, nickel, or another metal that can be catalyzed by the catalytic metal nanoparticles.

The crosslinked water-insoluble complex can be ink jet printed on the substrate in a patternwise fashion, and the metal-containing article can further comprise an electrically-conductive metal that has been electrolessly plated on the crosslinked water-insoluble complex in the same patternwise fashion so that only the pattern of the water-insoluble complex is electrolessly plated.

Methods for Making and Using Articles

The present invention can be used in various methods for providing articles as described above. For example, precursor articles described above can be prepared by ink jet printing a metal-containing composition (as described above) onto a suitable substrate (as described above). The metal-containing composition comprises a water-soluble complex of a reactive polymer (as described above) with reducible metal ions. The metal-containing composition can be ink jet printed in any suitable manner with suitable equipment as described below in a patternwise fashion to provide any desired predetermined or random pattern on a supporting surface.

It may also be possible to use the present invention to provide certain specifically designed patterns for optimal non-toxic bioadhesion control so that marine organisms are less likely to foul or adhere to the resulting article in which the reducible metal ions (such as silver ions) have been reduced to metal nanoparticles (such as silver nanoparticles). Some of such patterns are sometimes identified as Sharklet™ patterns as described in U.S. Patent Application Publication 2010/0226943A1 (Brennan et al.), the disclosure of which is incorporated herein by reference.

The ink jettable and UV-curable compositions described herein can be ink jet printed onto a substrate using suitable ink jet printing processes and equipment.

In most embodiments, the ink jet printed image is provided by ink jet printing an ink jettable and UV-curable composition using thermal or piezoelectric drop-on-demand (DOD) printheads and continuous (CIJ) printheads that utilize electrostatic charging devices and deflector plates. Each type of printhead and apparatus attached thereto require specific properties in the ink jettable and UV-curable composition in order to achieve reliable and accurate jetting.

For example, in many embodiments, the ink jettable and UV-curable composition has a dedicated delivery channel.

When the method is carried out using CIJ apparatus and processes, it comprises:

ink jetting the ink jettable and UV-curable composition described herein from a main fluid supply as a continuous stream that is broken into both the spaced drops and non-printing drops; and collecting and returning the non-printing drops to the main fluid supply.

For all of the ink jetting operations and particularly for ink jetting the ink jettable and UV-curable composition, ink jetting can be carried out at a suitable firing frequency of at least 350 kHz with a near nozzle velocity of at least 15 m/sec (a thermal print head would be 10 kHz and about 10 m/sec velocity).

The ink jettable and UV-curable composition can be positioned in any one of the printhead ports intended for use in the present invention. Multiple ink jettable and UV-curable compositions can be positioned on the same carriage assembly, or each can be positioned on a separate carriage assembly in the ink jet printing apparatus.

In other embodiments, a method is used to provide an article comprising metal nanoparticles such as silver nanoparticles or palladium nanoparticles. This method comprises, firstly inkjet printing a metal-containing composition (containing reducible metal ions as described above) onto either or both supporting surfaces of a suitable substrate (as described above). If the metal-containing composition is composed of reducible metal ions, they can be reduced after disposing the metal-containing composition onto the substrate and UV-curing to form a water-insoluble pattern. The reducible metal ions in the water-soluble complex are then reduced (using chemistry described below) to form metal nanoparticles (for example, having an average diameter described above, for example at least 2 nm and up to and including 500 nm) in the water-soluble complex. For example, reducible silver ions can be reduced using an aqueous solution of dimethylborane, a borohydride, a hypophosphite, an amine, an aldehyde, or a sugar. If a metal-containing is composed of metal nanoparticles formed by reducing the metal ion-containing composition before disposing it onto a substrate, the resulting article can be stored for later use if desired, but in many embodiments, the water-soluble complex containing the metal nanoparticles is photoexposed using conditions described below (for example, using ultraviolet radiation having a $\lambda_{max}$ of at least 150 nm) to form an ink jet printed, crosslinked, water-insoluble complex comprising the metal nanoparticles on one or both supporting surfaces of the substrate.

In some embodiments, this method further comprises, after photoexposing the water-soluble complex to form the crosslinked water-insoluble complex containing metal nanoparticles, heating the crosslinked water-insoluble complex containing metal nanoparticles at a temperature sufficient to further crosslink the crosslinked water-insoluble complex containing the metal nanoparticles. Conditions for this heating treatment are described below.

The crosslinked, water-insoluble complex containing metal nanoparticles, on either or both supporting surfaces of the substrate, can be electrolessly plated using an electrically-conductive metal using solutions and conditions as described in more detail below.

Thus, in some useful embodiments, the method can comprise:

providing a substrate, ink jetting an ink jettable and UV-curable composition (as described above) onto the substrate in an imagewise fashion to form an ink jetted image on the substrate, and UV-curing the ink jetted image to form a UV-cured ink jetted image on the substrate.

This method can be continued by:

contacting the UV-cured ink jet image with reducible metal ions or metal nanoparticles to form a UV-cured metallized image on the substrate, if the UV-cured metallized image comprises reducible metal ions, contacting the UV-cured metallized image with a metal ion reducing agent, and optionally, electrolessly plating the UV-cured metallized image on the substrate.

For example, in such methods, a metal-containing composition can be ink jet printed onto one or both supporting surfaces of the substrate in a patternwise fashion.

In some particularly useful embodiments, the compositions of the present invention can be used to prepare electrically-conductive patterns on both supporting surfaces of a flexible continuous web, such as a continuous (roll) of polymeric substrate, for example in a roll-to-roll manufacturing operation. Thus, in such embodiments, the method for providing a "dual-sided" article, comprising ink jet printing a metal-containing composition (as described above) onto at least a first supporting surface of a suitable substrate (such as a continuous web). After ink jet printing the metal-containing composition onto the first supporting surface of the substrate, and UV-curing the printed composition, the reducible metal ions in the UV-cured complex can be reduced to form metal nanoparticles in the water-soluble complex on the first supporting surface of the substrate using the reducing conditions and solutions described below. The same or different metal-containing composition can then be disposed in a suitable fashion onto an opposing second supporting surface of the same substrate, and after UV-curing the metal-containing composition on the opposing second supporting surface of the substrate, the reducible metal ions in the water-soluble complex can be reduced to form metal nanoparticles in the water-soluble complex on the opposing second supporting surface of the substrate. It is also possible to remove any remaining water-soluble complex from both the first supporting surface and the opposing second supporting surface of the substrate.

In many of such embodiments, the method further comprises:

electrolessly plating the crosslinked water-insoluble complex on either or both of the first supporting surface and the second opposing supporting surface of the substrate using an electrically-conductive metal (using electrolessly plating solutions and conditions described below).

In such embodiments, the method can also comprise:

photoexposing the water-soluble complex containing the metal nanoparticles on either or both of the first supporting surface and the opposing second supporting surface in a patternwise fashion on the substrate.

Photoexposing of the water-soluble complex can be carried out using ultraviolet radiation having $\lambda_{max}$ of at least 150 nm.

After such features, the method can further comprise, after photoexposing the water-soluble complex on either or both of the first supporting surface and the opposing second supporting surface of the substrate to form the crosslinked water-insoluble complex containing metal nanoparticles, heating the crosslinked water-insoluble complex containing metal nanoparticles on either or both of the first supporting surface and the opposing second supporting surface of the substrate at a temperature sufficient to further crosslink the crosslinked water-insoluble complex containing the metal nanoparticles.

The reducing feature can be carried out on both supporting surfaces of the substrate using an aqueous solution for example containing dimethylamine borane, a borohydride, a hypophosphite, an amine, an aldehyde, or a sugar, when the reducible metal ions are reducible silver ions.

The following discussion provides some details about representative electroless plating methods.

In electroless plating methods, each aqueous-based "processing" solution, dispersion, or bath (for example, solutions containing electroless seed metal ions, reducing agent solutions, and solutions for electroless plating, as well as rinsing solutions) used at various points can be specifically designed with essential components as well as optional addenda readily apparent to one skilled in the art. For example, one or more of those aqueous-based processing solutions can include such addenda as surfactants, anti-coagulants, anti-corrosion agents, anti-foamants, buffers, pH modifiers, biocides, fungicides, and preservatives. The aqueous-based reducing solutions can also include suitable antioxidants.

Exposure of the ink jetted images can be carried out using radiation having a $\lambda_{max}$ of at least 150 nm and up to and including 700 nm or to radiation having a $\lambda_{max}$ of at least 250 nm and up to and including 450 nm. This exposure can be provided with any suitable exposing source or device that provides the desired radiation including but not limited to, various arc lamps and LED sources. The particular exposing source can be chosen depending upon the absorption characteristics of the ink jettable and UV-curable composition used. Exposure time can range from a fraction (0.1) of a second and up to and including 10 minutes depending upon the intensity of the radiation source and the ink jettable and UV-curable composition.

It is optional but desirable to heat or bake an article simultaneously with or after the exposure at a temperature sufficient to further crosslink the at least partially crosslinked reacted polymer. Such heating can be accomplished on a hot plate with vacuum suction to hold the article in close contact with the heating surface. Alternatively, the heating device can be a convection oven. The duration of the heating procedure is generally less than 10 minutes with heating for least 10 seconds and up to and including 5 minutes being most likely. The optimal heating time and temperature can be readily determined with routine experimentation.

Reduction of the reducible metal ions at a suitable time can be done by contacting the complex containing such reducible metal ions with a suitable reducing agent for the metal ions, for example by immersion within an aqueous-based reducing solution containing one or more reducing agents for a suitable time to cause sufficient metal ion reduction to metal nanoparticles. Alternatively, an aqueous-based reducing solution comprising the reducing agent can be sprayed or rolled uniformly onto an ink jet printed image containing the reducible metal ions.

For reducible silver ions, useful reducing agents include but are not limited to, an organic borane, an aldehyde such as formaldehyde, aldehyde sugar, hydroquinone, or sugar (or polysaccharide) such as ascorbic acid, and metal ions such as tin(II). These reducing agents can be used individually or in combination, and the total amount in the aqueous-based reducing solution used for the reducing procedure can be at least 0.01 weight % and up to and including 20 weight % based on the total reducing solution weight. The amount of reducing agent to be used will depend upon the reducing agent to be used and this can be readily optimized using routine experimentation. The time and temperature for the reduction can also be readily optimized in the same manner. Generally, the reducing temperature is at least room temperature (about 20° C.) and up to and including 95° C. and the reducing time can be for at least 1 second and up to and including 30 minutes.

For example, some embodiments using reducible silver ions can be carried out using an immersion bath comprising 1 reducing solution weight % of an organic borane such as dimethylamine borane (DMAB) at room temperature for up to 3 minutes. Longer or shorter times at higher temperatures are possible if needed.

After a reducing procedure, the complex containing the metal nanoparticles can be washed using distilled water or deionized water or another aqueous-based solution at a suitable temperature for a suitable time.

The resulting article can be immediately immersed in an aqueous-based electroless metal plating bath or solution, or the article can be stored with just the catalytic pattern comprising the metal nanoparticles as electroless seed metal particles for use at a later time.

For example, the article containing catalytic metal nanoparticles in the crosslinked, water-insoluble complex can be contacted with an electroless plating metal that is the same as or different from the catalytic electroless seed metal nanoparticles. In most embodiments, the electroless plating metal is a different metal from the catalytic electroless seed metal nanoparticles.

Any metal that will likely electrolessly "plate" on the catalytic electroless seed metal nanoparticles can be used at this point, but in most embodiments, the electroless plating metal can be for example copper(II), silver(I), gold(IV), palladium(II), platinum(II), nickel(II), chromium(II), and combinations thereof. Copper(II), silver(I), and nickel(II) are particularly useful electroless plating metals.

The one or more electroless plating metals can be present in the aqueous-based electroless plating bath or solution in an amount of at least 0.01 weight % and up to and including 20 weight % based on total solution weight.

Electroless plating can be carried out using known temperature and time conditions, as such conditions are well known in various textbooks and scientific literature. It is also known to include various additives such as metal complexing agents or stabilizing agents in the aqueous-based electroless plating solutions. Variations in time and temperature can be used to change the metal electroless plating thickness or the metal electroless plating deposition rate.

A useful aqueous-based electroless plating solution or bath is an electroless copper(II) plating bath that contains formaldehyde as a reducing agent. Ethylenediaminetetraacetic acid (EDTA) or salts thereof can be present as a copper complexing agent. For example, copper electroless plating can be carried out at room temperature for several seconds and up to several hours depending upon the desired deposition rate and plating rate and plating metal thickness.

Other useful aqueous-based electroless plating solutions or baths comprise silver(I) with EDTA and sodium tartrate, silver(I) with ammonia and glucose, copper(II) with EDTA and dimethylaminoborane, copper(II) with citrate and hypophosphite, nickel(II) with lactic acid, acetic acid, and a hypophosphite, and other industry standard aqueous-based electroless baths or solutions such as those described by Mallory et al. in *Electroless Plating: Fundamentals and Applications* 1990.

After the electroless plating procedure, the resulting product article can be removed from the aqueous-based electroless plating bath or solution and can again be washed using distilled water or deionized water or another aqueous-based solution to remove any residual electroless plating chemistry.

To change the surface of the electroless plated metal for visual or durability reasons, it is possible that a variety of post-treatments can be employed including surface plating of still at least another (third or more) metal such as nickel or silver on the electrolessly plated metal (this procedure is sometimes known as "capping"), or the creation of a metal oxide, metal sulfide, or a metal selenide layer that is adequate to change the surface color and scattering properties without reducing the conductivity of the electrolessly plated (second) metal. Depending upon the metals used in the various capping procedures of the method, it may be desirable to treat the electrolessly plated metal with a seed metal catalyst in an aqueous-based seed metal catalyst solution to facilitate deposition of additional metals.

As one skilled in the art should appreciate, the individual treatment features or steps described above for these methods can be carried out two or more times before proceeding to the next procedure or step. For example, multiple treatments with an aqueous-based reducing solution or aqueous-based electroless metal plating solution can be carried out in sequence, using the same or different conditions. Sequential washing or rinsing steps can also be carried out where appropriate.

In some embodiments, the water-soluble complexes containing the reactive polymers can be ink jet printed on various substrates in a patternwise manner for further chemical reactions such as providing catalytic metal nanoparticles (such as silver nanoparticles) that can then be used to form high resolution electrically-conductive metal patterns as described herein. Such electrically-conductive metal patterns can be incorporated into various devices including but not limited to touch screens or other display devices that can be used in numerous industrial, consumer, and commercial products. Thus, patterns formed from the metal-containing compositions can be incorporated into various articles or devices.

Systems and methods of fabricating flexible and optically compliant touch sensors in a high-volume roll-to-roll manufacturing process wherein micro electrically-conductive features can be created in a single pass are possible. The ink jettable and UV-curable compositions of the present invention can be used to prepare such systems and methods with one or more ink jet printing devices to form multiple high resolution electrically-conductive images. Multiple patterns can be ink jet printed on one or both supporting surfaces of a substrate. For example, one predetermined pattern can be ink jet printed on one supporting surface of the substrate and a different predetermined pattern can be ink jet printed on the opposing second supporting surface of the substrate that can be a continuous web.

In some embodiments, the present invention can be used to provide metal-containing articles such as silver-containing articles or copper-containing articles that can be used for anti-fouling or antimicrobial purposes in aquatic or marine environments, or in clothing or medical devices.

The present invention provides at least the following embodiments and combinations thereof, but other combinations of features are considered to be within the present invention as a skilled artisan would appreciate from the teaching of this disclosure:

1. An ink jettable and UV-curable composition comprising:
a reactive polymer comprising: (a1) at least 20 mol % of recurring units comprising pendant metal complexing water-solubilizing groups, (b) at least 5 mol % of recurring units comprising a pendant group capable of crosslinking via [2+2] photocycloaddition, and optionally (c) at least 1 mol % of recurring units comprising a pendant amide, hydroxyl, or lactam group, or a pendant precursor moiety for the pendant amide, hydroxyl, or lactam group, all amounts based on the total recurring units in the reactive polymer; and
optionally, one or more of the following components:
a humectant,
a dye or pigment colorant,
an anionic or nonionic surfactant,
a water-soluble or water-dispersible acrylic polymer, and
a water-soluble or water-dispersible polyurethane.

2. An ink jettable and UV-curable composition comprising:
a complex of reducible metal ions or metal nanoparticles with a reactive polymer, the reactive polymer comprising: (a2) at least 5 mol % of recurring units comprising pendant sulfonate groups, (b) at least 5 mol % of recurring units comprising a pendant group capable of crosslinking via [2+2] photocycloaddition, and optionally (c) at least 1 mol % of recurring units comprising a pendant amide, hydroxyl, lactam group, carboxylic acid, phosphonic acid group or a pendant precursor moiety for the pendant amide, hydroxyl, lactam, carboxylic acid, or phosphonic acid group, all amounts based on the total recurring units in the reactive polymer; and
optionally, one or more of the following components:
a humectant,
a dye or pigment colorant,
an anionic or nonionic surfactant,
a water-soluble or water-dispersible acrylic polymer, and
a water-soluble or water-dispersible polyurethane.

3. The ink jettable and UV-curable composition of embodiment 1 that comprises a complex of reducible silver ions or silver nanoparticles with the reactive polymer.

4. The ink jettable and UV-curable composition of embodiment 2 or 3, comprising a complex of silver nanoparticles with the reactive polymer, wherein the silver nanoparticles have an average diameter of at least 2 nm and up to and including 500 nm.

5. The ink jettable and UV-curable composition of any of embodiments 2 to 4, comprising a complex of silver nanoparticles with the reactive polymer, wherein the silver nanoparticles have an aspect ratio of less than 2.

6. The ink jettable and UV-curable composition of any of embodiments 2 to 5, comprising a complex of silver nanoparticles with the reactive polymer, wherein the silver nanoparticles have an aspect ratio of greater than or equal to 2.

7. The ink jettable and UV-curable composition of embodiment 2 that comprises a complex of reducible palladium ions or palladium nanoparticles with the reactive polymer.

8. The ink jettable and UV-curable composition of any of embodiments 1 to 7, wherein the reactive polymer comprises at least 40 mol % of the (a1) recurring units comprising sulfonic acid or sulfonate groups, based on the total recurring units in the reactive polymer.

9. The ink jettable and UV-curable composition of any of embodiments 1 to 8, wherein the reactive polymer comprises at least 5 mol % and up to and including 50 mol % of the (b) recurring units, based on the total recurring units in the reactive polymer.

10. The ink jettable and UV-curable composition of any of embodiments 1 to 9, wherein the reactive polymer comprises at least 1 mole % and up to and including 55 mol % of (c) recurring units comprising pendant hydroxyl, amide, or carboxylic acid groups, based on the total recurring units in the reactive polymer.

11. The ink jettable and UV-curable composition of any of embodiments 1 to 10, wherein the (b) recurring units comprise:

(i) a photosensitive —C(=O)—CR=CR$^1$—Y group wherein R and R$^1$ are independently hydrogen or an alkyl group having 1 to 7 carbon atoms, a 5- to 6-membered cycloalkyl group, an alkoxy group having 1 to 7 carbon atoms, a phenyl group, or a phenoxy group, and Y is an aryl or heteroaryl group;

(ii) a photosensitive, non-aromatic unsaturated carbocyclic group;

(iii) a photosensitive, aromatic or non-aromatic heterocyclic group comprising a carbon-carbon double bond that is conjugated with an electron withdrawing group;

(iv) a photosensitive non-aromatic unsaturated heterocyclic group comprising one or more amide groups that are conjugated with a carbon-carbon double bond, which photosensitive non-aromatic unsaturated heterocyclic group is linked to the water-soluble backbone at an amide nitrogen atom, or (v) a photosensitive substituted or unsubstituted 1,2-diarylethylene group.

12. The ink jettable and UV-curable composition of any of embodiments 1 to 11, further comprising a humectant that is chosen from at least one of the following groups of compounds:

(1) polyhydric alcohols;
(2) polyoxygenated polyols and their derivatives;
(3) sulfur-containing polyol compounds;
(4) cyclic lactams; and
(5) cyclic ureas.

13. The ink jettable and UV-curable composition of any of embodiments 1 to 12, further comprising a pigment colorant.

14. The ink jettable and UV-curable composition of embodiment 13 further comprising a pigment colorant that has a median particle diameter of less than 150 nm and more likely less than 100 nm, in an amount of at least 0.1 weight % and up to and including 30 weight %, based on the total weight of the ink jettable and UV-curable composition.

15. The ink jettable and UV-curable composition of any of embodiments 1 to 14, further comprising a nonionic surfactant.

16. The ink jettable and UV-curable composition of any of embodiments 1 to 15, further comprising a water-soluble or water-dispersible polyurethane.

17. The ink jettable and UV-curable composition of any of embodiments 1 to 16 having a viscosity of less than 3 centipoise as measured at 25° C.

18. The ink jettable and UV-curable composition of any of embodiments 1 to 17, further comprising a photosensitizer.

The following Examples are provided to illustrate the practice of this invention and are not meant to be limiting in any manner.

Synthesis of 2-Cinnamoyl-Oxymethyl Methacrylate Monomer

Into a 500 ml, 3 neck round bottom flask equipped with a condenser and magnetic stir bar, were added 2-hydroxyethyl methacrylate, (11.30 g, 0.0868 mole) ($M_w$=130.14 g/mole), dichloromethane (DCM) (60 g), and triethylamine ($M_w$=101.19 g/mole) (8.50 g, 0.084 mole). The reaction mixture was stirred until a homogenous solution was obtained and it was placed in an ice bath. A solution of cinnamoyl chloride ($M_w$=166.6 g/mole) (13.33 g, 0.080 mole) dissolved in 30 g of DCM was slowly added dropwise over the course of 15 minutes. After this addition, the reaction was allowed to come to room temperature, placed in oil bath at 40° C. and refluxed for 60 minutes to complete the reaction. The reaction mixture was then cooled and removed from the oil bath and the amine hydrochloride precipitate formed during the reaction was filtered off. Additional DCM was added and the reaction mixture was placed into a separatory funnel and the filtered solution was washed twice with sodium bicarbonate, washed twice with distilled water, washed once with dilute hydrochloric acid solution, and then washed twice with distilled water. The organic layer was placed over magnesium sulfate for 30 minutes and filtered. The DCM was removed by evaporation and the remaining product was placed under high vacuum at room temperature overnight to remove any residual DCM. The final product was a clear oil with a yellow tint having an $M_w$ of 260.29 g/mole. The purity was verified by NMR.

Synthesis of 7-(2-Methacryloyloxyethoxy)-4-methylcoumarin Monomer 15.3 g of 4-Methylumbelliferone (7-hydroxy-4-methylcourmarin) was dissolved in about 300 ml of dimethylacetamide (DMA) in a 3-neck 1 liter flask with an overhead stirrer. 48 g of Potassium carbonate, 20.8 g of 2-((methylsulfonyl)oxy)ethyl methacrylate prepared from 2-hydroxyethyl methacrylate using standard procedures, and 1.66 g of potassium iodide were then added and the reaction mixture was heated in an oil bath at 70° C. about 18 hours. Thin layer chromatography was used to determine that the reaction was complete. The reaction solution was cooled and poured into about 1 liter of water, stirred for about an hour, and the precipitate was filtered. The precipitate was then rinsed with another 1 liter of water then heptane and dried on the filter. The desired product was confirmed by NMR. A portion of the product was further purified by silica gel chromatography with ethyl acetate. The ethyl acetate was removed by evaporation and the product was crystallized from heptane to obtain a white powder.

Preparation of Inventive Terpolymer A from Styrene Sulfonic Acid Sodium Salt, Methacrylic Acid, and 7-(2-Methacryloyloxyethoxy)-4-Methylcoumarin in a 50:30:20 mol % Ratio 5.0 g of Styrene sulfonic acid sodium salt, 1.25 g of methacrylic acid, and 2.80 g of 7-(2-methacryloyloxy-ethoxy)-4-methylcoumarin were weighed out into a 250 ml single neck round bottom flask dissolved in a solvent mixture of 27 g of water, 27 g of dimethylacetamide (DMA), and 27 g of isopropyl alcohol. 0.45 g of AMBN free radical initiator was added and nitrogen was bubbled through the solvent mixture for 30 minutes before heating it in an oil bath at 80° C. for about 18 hours. The reaction solution was cooled and diluted with water to form a clear solution. The reaction solution was dialyzed for about 18 hours and then concentrated to a 15.55 weight % solids solution that was suitable for coating. The weight average molecular weight ($M_w$) of the resulting Terpolymer A was 48,500 as determined by size exclusion chromatography (SEC).

Preparation of Inventive Terpolymer B from Styrene Sulfonic Acid Sodium Salt, Methacrylic Acid, and 7-(2-Methacryloyloxyethoxy)-4-Methylcoumarin in a 10:70:20 mol % Ratio 1.25 g of Styrene sulfonic acid sodium salt, 3.65 g of methacrylic acid, and 3.50 g of 7-(2-methacryloyloxy-ethoxy)-4-methylcoumarin were weighed out into a 250 ml single neck round bottom flask dissolved in a solvent mixture of 25 g of water, 25 g of dimethylacetamide (DMA), and 25 g of isopropyl alcohol. 0.42 g of AMBN free radical initiator was added and nitrogen was bubbled through the solvent mixture for 30 minutes before heating it in an oil bath at 80° C. for about 18 hours. The reaction solution was cooled and diluted with water to form a clear solution. The reaction solution was dialyzed for about 18 hours and then concentrated to a 15.30 weight % solids solution that was suitable for coating. The weight average molecular weight ($M_w$) of the resulting Terpolymer B was 72,400 as determined by size exclusion chromatography (SEC).

Preparation of Inventive Terpolymer C from 3-Sulfopropyl Methacrylate Potassium Salt, Methacrylic Acid, and 2-Cinnamoyl-oxyethyl Methacrylate in a 50:30:20 mol % Ratio In a 500 ml single neck round bottom flask, 13.86 g of 3-sulfopropyl methacrylate potassium salt, 2.91 g of methacrylic acid, 5.85 g of 2-cinnamoyl-oxyethyl methacrylate, and 0.566 g of AMBN free radical initiator were dissolved in a solvent mixture consisting of 130.08 g of water, 44.22 g of methyl ethyl ketone (MEK), and 85.83 g of isopropyl alcohol (IPA). The reaction mixture was purged with nitrogen capped with a septum and kept in a preheated oil bath at 80° C. overnight. The reaction mixture was then cooled and placed in a dialysis bag with MWCO of 3500 and dialyzed until the bag was fully swollen. The contents were then evaporated to a concentration of 15.3 weight % solids. The weight average molecular weight ($M_w$) of the resulting Terpolymer C was 52,700 as determined by size exclusion chromatography (SEC).

Preparation of Inventive Terpolymer D from 3-Sulfopropyl Methacrylate Potassium Salt, Methacrylic Acid, and 7-(2-Methacryloyloxyethoxy)-4-Methylcoumarin in a 10:70:20 mol % Ratio 1.6 g of 3-Sulfopropyl methacrylate potassium salt, 3.91 g of methacrylic acid, and 3.75 g of 7-(2-methacryloyloxy-ethoxy)-4-methylcoumarin were weighed out in a 250 ml single neck round bottom flask and dissolved in a solvent mixture of 28 g of water, 28 g of dimethylacetamide (DMA), and 28 g of isopropyl alcohol. 0.46 g of AMBN free radical initiator was added and nitrogen was bubbled through the solvent mixture for 30 minutes before heating in an oil bath at 80° C. for about 18 hours. The reaction mixture was cooled and diluted with water to form a clear solution. The reaction solution was dialyzed for about 18 hours and then concentrated to a 14.52 weight % solids solution that was suitable for coating. The weight average molecular weight ($M_w$) of the resulting Terpolymer D was 90,800 as determined by size exclusion chromatography (SEC).

Preparation of Inventive Terpolymer E from 3-Sulfopropyl Methacrylate Potassium Salt, Methacrylic Acid, and 7-(2-Methacryloyloxyethoxy)-4-Methylcoumarin in a 10:70:20 mol % Ratio with Reduced Molecular Weight 1.6 g of 3-Sulfopropyl methacrylate potassium salt, 1.25 g of methacrylic acid, and 3.75 g of 7-(2-methacryloyloxy-ethoxy)-4-methylcoumarin were weighed out in a 250 ml single neck round bottom flask and dissolved in a solvent mixture of 18 g of water, 35 g of dimethylacetamide (DMA), and 53 g of isopropyl alcohol. 0.46 g of AMBN free radical initiator was added and nitrogen was bubbled through the slurry for 30 minutes before heating in an oil bath at 80° C. for about 18 hours. The reaction mixture was cooled and diluted with water to form a clear solution. The reaction solution was then dialyzed for about 18 hours and then concentrated to an 8.80 weight % solids solution that was suitable for coating. The weight average molecular weight ($M_w$) of the resulting Terpolymer E was 41,900 as determined by size exclusion chromatography (SEC).

Preparation of Inventive Copolymer F from 2-Acrylamido-2-methyl-1-propanesulfonic Acid and 2-Cinnamoyl-oxyethyl Methacrylate in an 80:20 mol % Ratio In a 100 ml single neck round bottom flask, 4.15 g of 2-acrylamido-2-methyl-1-propanesulfonic acid, 1.30 g of 2-cinnamoyl-oxyethyl methacrylate, and 0.054 g of AMBN free radical initiator were dissolved in a solvent mixture consisting of 10.29 g of water, 10.29 g of methyl ethyl ketone (MEK), and 10.29 g of isopropyl alcohol (IPA). The reaction mixture was purged with nitrogen capped with a septum and kept in a preheated oil bath at 70° C. overnight. The reaction mixture was then cooled and placed in a dialysis bag with MWCO of 3500 and dialyzed until the bag was fully swollen. The contents were then evaporated to a concentration of 18.9 weight % solids. The weight average molecular weight ($M_w$) of the resulting Copolymer F was 26,100 as determined by size exclusion chromatography (SEC).

Preparation of Inventive Terpolymer G from 2-Acrylamido-2-methyl-1-propanesulfonic Acid, Methacrylic Acid, and 2-Cinnamoyl-oxyethyl Methacrylate in a 50:30:20 mol % Ratio In a 100 ml single neck round bottom flask, 2.59 g of 2-acrylamido-2-methyl-1-propanesulfonic acid, 0.65 g of methacrylic acid, 1.30 g of 2-cinnamoyl-oxyethyl methacrylate, and 0.045 g of AMBN free radical initiator were dissolved in a solvent mixture consisting of 8.58 g of water, 8.58 g of methyl ethyl ketone (MEK), and 8.58 g of isopropyl alcohol (IPA). The reaction mixture was purged with nitrogen capped with a septum and kept in a preheated oil bath at 70° C. overnight. The reaction mixture was then cooled and placed in a dialysis bag with MWCO of 3500 and dialyzed until the bag was fully swollen. The contents were then evaporated to a concentration of 18.64 weight % solids. The weight average molecular weight ($M_w$) of the resulting Terpolymer G was 62,200 as determined by size exclusion chromatography (SEC).

Preparation of Inventive Copolymer H from 2-Acrylamido-2-Methyl-1-Propanesulfonic Acid and 7-(2-Methacryloyloxyethoxy)-4-Methylcoumarin in an 80:20 mol % Ratio In a 100 ml single neck round bottom flask, 6.15 g of 2-acrylamido-2-methyl-1-propanesulfonic acid, 2.14 g of 7-(2-methacryloyloxyethoxy)-4-methylcoumarin, and 0.080 g of AMBN free radical initiator were dissolved in a solvent mixture consisting of 11 g of water, 11 g of methyl ethyl ketone (MEK), and 8.5 g of isopropyl alcohol (IPA). The reaction mixture was purged with nitrogen capped with a septum and kept in a preheated oil bath at 65° C. overnight. The reaction mixture was then cooled and placed in a dialysis bag with MWCO of 3500 and dialyzed until the bag was fully swollen. The contents were then evaporated to a concentration of 15.68 weight % solids. The weight average molecular weight ($M_w$) of the resulting Copolymer H was 48,900 as determined by size exclusion chromatography (SEC).

Preparation of Inventive Terpolymer I from 2-Acrylamido-2-Methyl-1-Propanesulfonic Acid, Methacrylic Acid, and 7-(2-Methacryloyloxyethoxy)-4-Methylcoumarin in a 50:30:20 mol % Ratio In a 250 ml single neck round bottom flask, 7.15 g of 2-acrylamido-2-methyl-1-propanesulfonic acid, 1.78 g of methacrylic acid, 3.98 g of 7-(2-Methacryloyloxyethoxy)-4-methylcoumarin, and 0.65 g of AMBN free radical initiator were dissolved in a solvent mixture consisting of 38 g of water, 38 g of methyl ethyl ketone (MEK), and 38 g of isopropyl alcohol (IPA). The reaction mixture was purged with nitrogen capped with a septum and kept in a preheated oil bath at 80° C. overnight. The reaction mixture was then cooled and placed in a dialysis bag with MWCO of 3500 and dialyzed until the bag was fully swollen. The contents were then evaporated to a concentration of 13.34 weight % solids. The weight average molecular weight ($M_w$) of the resulting Terpolymer I was 34,400 as determined by size exclusion chromatography (SEC).

Preparation of Comparative Copolymer J from 3-Sulfopropyl Methacrylate Potassium Salt and Methacrylic Acid in a 50:50 mol % Ratio In a 250 ml single neck round bottom flask, 8.0 g of 3-sulfopropyl methacrylate potassium salt was dissolved in 49 g of distilled water. Then 2.80 g of methacrylic acid was added along with 49 g of isopropyl alcohol and 0.22 g of AMBN free radical initiator. The reaction mixture was purged with nitrogen, capped with a septum and kept in a preheated oil bath at 70° C. overnight. The reaction mixture was then cooled, diluted with water and placed in a dialysis bag with MWCO of 3500 and dialyzed until the bag was fully swollen. The contents were then evaporated to a concentration of 12.57 weight % solids. The weight average molecular weight ($M_w$) of the resulting comparative Copolymer J was 85,000 as determined by size exclusion chromatography (SEC).

General Preparation of Metal Nano-Particle UV-Crosslinkable Polymer Complex

Into a high density polyethylene bottle with magnetic stirring, the following components were added in order: a quantity of an inventive in jettable and UV-crosslinkable composition described above to provide 10 weight % of reactive polymer in the final solution, along with any additional water required to adjust the final reaction concentration. A quantity of 2 molar silver nitrate solution adequate to complex 75% of the available acid monomer units in the reactive polymer was then added dropwise with good stirring. This was followed by the addition of a 4 weight % solution of dimethyl amine borane (DMAB) such that the molar ratio of silver ion to DMAB was about 9:1. The resulting solution was then placed in a dialysis tube with a molecular weight cut-off of 3500 for about 24 hours. The solution was then concentrated to 10 to 15 weight % total solids.

Preparation of Ink Jettable and UV-Curable Compositions

General Ink Jettable and UV-Curable Composition Preparation:

Into an approximately 60 ml high density polyethylene bottle equipped with magnetic stirring, the following components were added in order: a reactive polymer, about 50 to 90% of the makeup water, a humectant, a surfactant, any additional optional polymers such as a water-soluble polyurethane, and optionally about 0.02 weight % of a biocide such as Kordek MLX. While stirring, a 2 molar solution of sodium hydroxide was used to adjust the pH to 7.5+/−0.2 and any final makeup water was then added to adjust the total solids to aim. Pigment dispersions, dyes, or pH sensitive polymers were added after the pH was adjusted as described above. A final pH adjustment can be done after all components are added. The resulting ink jettable and UV-curable composition was stirred for approximately 30 minutes and filtered with a 1.0 um disk filter. See TABLE I below for the components of the inventive ink jettable and UV-curable compositions 1-15.

TABLE I

| Ink Jettable and UV-curable Composition | Weight % UV-Curable Polymer | Weight % Humectant | Weight % Surfactant |
| --- | --- | --- | --- |
| Inventive 1 | 4% Terpolymer A | 10% Ethylene glycol | 0.5% Tergitol ® 15-S-9 |
| Inventive 2 | 4% Terpolymer B | 10% Ethylene glycol | 0.5% Tergitol ® 15-S-9 |
| Inventive 3 | 2% Terpolymer C | 10% Ethylene glycol | 0.5% Tergitol ® 15-S-9 |

TABLE I-continued

| Ink Jettable and UV-curable Composition | Weight % UV-Curable Polymer | Weight % Humectant | Weight % Surfactant |
|---|---|---|---|
| Inventive 4 | 2% Terpolymer D | 10% Ethylene glycol | 0.5% Tergitol ® 15-S-9 |
| Inventive 5 | 2% Terpolymer E | 10% Ethylene glycol | 0.5% Tergitol ® 15-S-9 |
| Inventive 6 | 4% Copolymer F | 10% 2-Pyrrolidinone | 0.5% Tergitol ® 15-S-9 |
| Inventive 7 | 4% Terpolymer G | 10% 2-Pyrrolidinone | 0.5% Tergitol ® 15-S-9 |
| Inventive 8 | 2% Copolymer H | 10% Ethylene glycol | 0.5% Tergitol ® 15-S-9 |
| Inventive 9 | 2% Terpolymer I | 10% Ethylene glycol | 0.5% Tergitol ® 15-S-9 |
| Inventive 10 | 2.6% Terpolymer A Silver Nanoparticle Complex | 10% Ethylene glycol | 0.5% Tergitol ® 15-S-9 |
| Inventive 11 | 2.6% Terpolymer C Silver Nanoparticle Complex | 10% Ethylene glycol | 0.5% Tergitol ® 15-S-9 |
| Inventive 12 | 2% Terpolymer C | None | 0.5% Tergitol ® 15-S-9 |
| Inventive 13 | 2% Terpolymer C | 10% Ethylene glycol | None |
| Inventive 14 | 2% Terpolymer C | None | None |
| Inventive 15 | 8% Terpolymer A | 10% Ethylene glycol | 0.5% Tergitol ® 15-S-9 |

Basic ink jetting performance in a thermal print head was evaluated using an ink jetting fixture with a laser drop detector that was capable of determining the drop position after the ejection pulse and thereby the drop velocity as a function of ink ejection parameter such as voltage, firing frequency, latency times, and total number of ejections for each nozzle can be determined if required.

Jetting Performance of Ink Jettable and UV-Curable Compositions:

TABLE II

| Ink Jettable and UV-curable Composition | Drop velocity at 12 kHz | Velocity COV at 12 kHz | Frequency limit kHz | % Velocity change of 1st drop after 20 sec hold | % Velocity change after $10^7$ ejections |
|---|---|---|---|---|---|
| Inventive 1 | 16 m/sec | 0.5% | 24 | −9% | +16% |
| Inventive 2 | 19 m/sec | 1.3% | 19 | −17% | +7% |
| Inventive 3 | 17 m/sec | 2% | 24 | −9% | +1% |
| Inventive 4 | 17 m/sec | 0.6% | 24 | −14% | +12% |
| Inventive 5 | 17 m/sec | 1.7% | 24 | −47% | −4% |
| Inventive 6 | 17 m/sec | 1% | 19 | N/A | N/A |
| Inventive 7 | 17 m/sec | 2% | 12 | N/A | N/A |
| Inventive 8 | 19 m/sec | 1% | 19 | N/A | N/A |
| Inventive 9 | 13 m/sec | 2% | 16 | 0% | −12% |
| Inventive 10 | 19 m/sec | 2.5% | 18 | −28% | −75% |
| Inventive 11 | 18 m/sec | 5% | 18 | −13% | −65% |
| Inventive 12 | 17 m/sec | 5% | 22 | −26% | 0% |
| Inventive 13 | 15 m/sec | 3% | 24 | 0% | +7% |
| Inventive 14 | 15 m/sec | 2% | 24 | 0% | +17% |

The data in Table II show that ink jettable and UV-curable compositions prepared according to the present invention using reactive polymers described above and silver nanoparticle-polymer complexes can be ejected from a thermal print head with high drop velocities and low drop velocity variation at firing frequencies in excess of 20 kHz. The data also show adequate latency performance to allow printing with normal nozzle maintenance procedures. Moreover, the data show a drop in velocity change over 10 million ejections of less than about 20% for inks prepared without preformed metal nanoparticles indicating that they do not damage the print head and would provide reliable jetting performance. Metal-containing compositions prepared with a metal nano-particle complex showed higher velocity loss over the 10 million ejection cycle, but this could likely be improved through modifications of the metal nanoparticle formation process such as longer dialysis to remove salts and ink formulation optimization. Inventive ink jettable and UV-curable compositions L, M, and N showed that both the humectant and the surfactant are optional and excellent jetting performance can be obtained without these addenda. This is likely due to the fact that the reactive polymers used in these examples have intrinsic surfactant and humectant properties.

Preparation of Ink Jetted Prints (Patterns)

Inventive ink jettable and UV-curable Compositions A, B, C, D, J, K, and O were used to fill ink cartridges compatible with a Kodak® AIO desktop printer having a thermal print head. Various short-circuit patterns with lines ranging from 0.25 mm to 1.0 mm in width were printed onto a supporting surface of a poly(ethylene terephthalate) (PET) support that had been pre-coated with a glycidyl methacrylate-n-butyl methacrylate copolymer layer. Each ink jet printed image was exposed to broadband UV radiation to crosslink (cure) the printed composition, and then each cured image was electrolessly plated with copper as described below.

Electroless Copper Plating of Inkjet Printed Patterns:

Preparation of the Electroless Copper Plating Bath

The following components were dissolved in a glass container that had been cleaned with concentrated nitric acid followed by a thorough rinse with distilled water to eliminate any trace of metal on the glass: 1.8 g of copper (II) sulfate pentahydrate, 6.25 g of tetrasodium EDTA (ethylenediaminetetraacetic acid) tetrahydrate, 0.005 g of potassium ferrocyanide trihydrate, 2.25 g of 37 weight % formaldehyde solution, 80 g of distilled water, and about 2 to 3 g of a 45 weight % sodium hydroxide solution to adjust the pH to 12.8.

Electroless Plating of Inkjet Patterns from Ink Jettable and UV-Curable Compositions without Pre-Formed Metal Nanoparticles:

The inkjet printed images of the short-circuit patterns described above were exposed to a 1000 W broadband UV source with a 350-450 nm dichroic mirror for an exposure times ranging from 0 (unexposed) to 240 seconds, then immersed in an agitated distilled water bath for 2 minutes to remove any non-cured polymer. The non-exposed pattern was completely dissolved as would be expected. The patterns receiving about 15 or more seconds of UV exposure remained intact on the substrate although longer exposure times were required for thicker or higher % reactive polymer compositions. The wet patterns were then immersed in a 0.4 molar silver nitrate solution for 60 seconds and then washed in a distilled water bath to remove any uncomplexed silver ion. The patterns were then immersed in a 1 weight % dimethylamine borane (DMAB) bath for 30 seconds to reduce the complexed silver ions and to form complexed silver nano-particles suitable for catalyzing the electroless copper plating. After using the DMAB bath, the reduced printed patterns were again washed thoroughly in distilled water and then immersed in the agitated electroless copper plating bath described above for 10 minutes. A highly conductive copper film was formed on the ink jet printed and UV-cured patterns, allowing the short-circuit pattern to function and show conductivity if any of the fine copper wires formed in the pattern are crossed by a conductive material.

Inventive Copper Electroless Plating of Inkjet Patterns Using a Metal-Containing Composition:

The ink jetted prints made using Inventive ink jettable and UV-curable compositions J and K were exposed to a 1000 W broadband UV source with a 350-450 nm dichroic mirror for exposure times ranging from 60 to 480 seconds, then immersed in an agitated distilled water bath for 2 minutes to remove any non-cured reactive polymer. The resulting silver-containing patterns were then immersed in the agitated electroless copper plating bath described above for 7 minutes. A highly conductive copper pattern was formed on the silver-containing patterns, allowing the short-circuit pattern to function and showing conductivity if any of the fine copper wires formed in the pattern were crossed by a conductive material.

Inventive Ink Jettable and UV-Curable Composition Containing a Pigment and Electroless Plating of Inkjet Printed Patterns:

An ink jettable and UV-curable composition was prepared according to the present invention as described above and containing 4 weight % of Inventive Terpolymer A, 10 weight % of ethylene glycol humectant, and 0.5 weight % of Tergitol® 15-S-9 surfactant. After adjusting the pH to 7.5+/−0.2, 0.5 weight % of an aqueous cyan pigment dispersion was added. This cyan pigment dispersion contained C.I. Pigment Blue 15:3 (CAS 147-14-8, also known as Phthalocyanine blue BGS) dispersed with a terpolymer dispersant derived from 37 weight % of benzyl methacrylate, 30 weight % of n-octadecyl methacrylate, and 33 weight % of methacrylic acid (with 85% of the acid groups neutralized with potassium hydroxide).

The resulting silver-containing composition was loaded into an ink cartridge and printed using a thermal print-head desktop inkjet printer as described above. Electrode patterns having various line widths down to about 0.25 mm where printed, and exposed for 60 seconds to a 1000 W broadband UV source with a 350-450 nm dichroic mirror to cause curing of the reactive polymer (Inventive Terpolymer A). Following this UV exposure, the patterns were then immersed in an agitated distilled water bath for 2 minutes, immersed for 1 minute in a 0.4 molar silver nitrate bath, rinsed with distilled water, immersed for 30 seconds in a 0.68 molar DMAB bath, rinsed with distilled water, and then immersed in the electroless copper plating bath described above for 7 minutes. Highly conductive, brilliant copper lines were formed where the cyan pigment-containing ink jettable and UV-curable composition had been printed and UV-cured.

Inventive Ink Jettable and UV-Curable Composition Containing a Pigment and a Polyurethane and Electroless Plating of Ink Jet Printed Patterns:

An ink jettable and UV-curable composition was prepared according to the present invention as described above and containing 4 weight % of Inventive Terpolymer A, 10 weight % of ethylene glycol humectant, and 0.5 weight % of Tergitol® 15-S-9 surfactant. After adjusting the pH to 7.5+/−0.2, 0.5 weight % of the cyan pigment dispersion described above was added followed by the addition of 1 weight % of a water-soluble anionic polyether polyurethane with an acid number of 95 that had been prepared using conventional methods from isophorone diisocyanate, Terathane 2000 polyether glycol, and 2,2-bis(hydroxymethyl)propionic acid. The anionic polyether polyurethane was 95% neutralized using potassium hydroxide before its addition to the formulation.

The ink jetting characteristics of this ink jettable and UV-curable composition were evaluated and compared to the ink jettable and UV-curable composition described above containing the cyan pigment but no anionic polyether polyurethane. The average drop velocity at a firing frequency of 10 kHz improved from about 5 m/sec with a coefficient of variation of about 3% to 20 m/sec with a coefficient of variation of about 0.6%, thus showing that the additional polymer additive further improved ink jetting characteristics.

Ink jetted patterns were prepared, UV-cured, processed to form complexed silver nanoparticles, and electrolessly plated with copper as described above. Conductive copper metal lines were formed on the inkjet printed and UV-cured patterns.

Comparative Ink Jettable Composition:

An ink jettable composition outside of the present invention was prepared as described above to contain 4 weight % of Comparative Copolymer J, weight % of ethylene glycol humectant, 0.5 weight % of Tergitol® 15-S-9 surfactant. The pH was adjusted to 7.5+/−0.2. The ink jetting characteristics were evaluated using a laser drop detection fixture. The average drop velocity at 10 kHz firing frequency was measured at 10 m/sec with a coefficient of variation of 2.6%. This Comparative silver metal-containing ink jettable composition was loaded into an ink cartridge and ink jet printed using a thermal print-head desktop inkjet printer as described above. Electrode patterns with line various line widths down to about 0.25 mm where ink jet printed, exposed with a 1000 W broadband UV source with a 350-450 nm dichroic mirror for times ranging from 60 to 480 seconds.

Following the UV exposure, the printed patterns were then immersed in an agitated distilled water bath for 2 minutes, immersed for 1 minute in a 0.4 molar silver nitrate bath, rinsed with distilled water, immersed for 30 seconds in a 0.68 molar DMAB bath, rinsed with distilled water, and then immersed in the electroless copper plating bath described above for 7 minutes. No copper plating or conductive copper lines were formed because the printed patterns of the ink jettable composition washed off of the support because there was no pendant photocycloaddition groups present in the polymer to form crosslinks upon exposure to ultraviolet light. The ink jettable composition was not UV-curable.

Invention Nickel Electroless Plating of Ink Jet Printed Patterns Catalyzed with Palladium Nanoparticles:

Preparation of a Nickel Electroless Plating Bath

The following components were dissolved in a glass container that had been cleaned with concentrated nitric acid followed by a thorough rinse with distilled water to eliminate any trace of metal on the glass: 0.66 g of nickel (II) nitrate hexahydrate, 5.62 g of 85 weight % of lactic acid, 2.36 g of glacial acetic acid, 0.446 g of propionic acid, 0.375 g of a 100 ppm solution of thiourea in methanol, 4.725 g of 14.3 molar ammonium hydroxide solution, 130.4 g of distilled water, and 1.965 g of sodium hypophosphite hydrate (assumed 95 weight % sodium hypophosphite) that was added immediately before use. The temperature of the resulting nickel electroless plating bath was adjusted to 55° C.

An ink jettable and UV-curable composition of the present invention was prepared as described above to contain 4 weight % of Inventive Terpolymer A, 10 weight % of ethylene glycol humectant, 0.5 weight % of Tergitol® 15-S-9 surfactant, and the pH was adjusted to 7.5+/−0.2. The resulting ink jettable and UV-curable composition was loaded into an ink cartridge and ink jet printed using a thermal print-head desktop inkjet printer as described above. An electrode pattern with line widths of about 0.5 mm was printed and exposed for 120 seconds with a 1000 W broadband UV source with a 350-450 nm dichroic mirror.

Following the UV exposure, the UV-cured patterns were then immersed in an agitated distilled water bath for 2 minutes, and immersed for 5 minutes in a bath of 0.001 molar palladium chloride dissolved in a 1:1 mixture of water and acetonitrile to form a reducible palladium metal complex in the inkjet printed pattern. The pattern was then rinsed for 30 seconds in distilled water, immersed for 2 minutes in a 0.68 molar DMAB bath to reduce the palladium ions and to form a palladium nanoparticle complex in the UV-cured pattern. This was followed by a distilled water rinse, and immersion in the electroless nickel plating bath described above for 10 minutes. Conductive grey nickel metal was formed on the UV-cured pattern.

The invention has been described in detail with particular reference to certain preferred embodiments thereof, but it will be understood that variations and modifications can be effected within the spirit and scope of the invention.

The invention claimed is:

1. An ink jettable and UV-curable composition comprising:
a reactive polymer comprising: (a1) at least 40 mol % of recurring units comprising pendant metal complexing water-solubilizing groups that include a sulfonic acid group or sulfonate group in combination with a carboxylic acid group or carboxylate group, (b) at least 5 mol % of recurring units comprising a pendant group capable of crosslinking via [2+2] photocycloaddition, and optionally (c) at least 1 mol % of recurring units comprising a pendant amide, hydroxyl, or lactam group, or a pendant precursor moiety for the pendant amide, hydroxyl, or lactam group, all amounts based on the total recurring units in the reactive polymer; and
optionally, one or more of the following components:
a humectant,
a dye or pigment colorant,
an anionic or nonionic surfactant,
a water-soluble or water-dispersible acrylic polymer, and
a water-soluble or water-dispersible polyurethane.

2. The ink jettable and UV-curable composition of claim 1, wherein the reactive polymer comprises at least 40 mol % and up to and including 95 mol % of the (a1) recurring units, based on the total recurring units in the reactive polymer.

3. The ink jettable and UV-curable composition of claim 1, wherein the reactive polymer comprises at least 5 mol % and up to and including 50 mol % of the (b) recurring units, based on the total recurring units in the reactive polymer.

4. The ink jettable and UV-curable composition of claim 1, wherein the reactive polymer comprises at least 1 mole % and up to and including 55 mol % of (c) recurring units comprising pendant hydroxyl or amide groups, based on the total recurring units in the reactive polymer.

5. The ink jettable and UV-curable composition of claim 1, wherein the (b) recurring units comprise:
(i) a photosensitive —C(=O)—CR=CR$^1$—Y group wherein R and R$^1$ are independently hydrogen or an alkyl group having 1 to 7 carbon atoms, a 5- to 6-membered cycloalkyl group, an alkoxy group having 1 to 7 carbon atoms, a phenyl group, or a phenoxy group, and Y is an aryl or heteroaryl group;
(ii) a photosensitive, non-aromatic unsaturated carbocyclic group;
(iii) a photosensitive, aromatic or non-aromatic heterocyclic group comprising a carbon-carbon double bond that is conjugated with an electron withdrawing group;
(iv) a photosensitive non-aromatic unsaturated heterocyclic group comprising one or more amide groups that are conjugated with a carbon-carbon double bond, which photosensitive non-aromatic unsaturated heterocyclic group is linked to the water-soluble backbone at an amide nitrogen atom; or
(v) a photosensitive substituted or unsubstituted 1,2-diarylethylene group.

6. The ink jettable and UV-curable composition of claim 1, further comprising a humectant that is chosen from at least one of the following groups of compounds:
(1) polyhydric alcohols;
(2) polyoxygenated polyols and their derivatives;
(3) sulfur-containing polyol compounds;
(4) cyclic lactams; and
(5) cyclic ureas.

7. The ink jettable and UV-curable composition of claim 1, further comprising a pigment colorant.

8. The ink jettable and UV-curable composition of claim 1 further comprising a pigment colorant that has a median particle diameter of less than 150 nm, in an amount of at least 0.1 weight % and up to and including 30 weight %, based on the total weight of the ink jettable and UV-curable composition.

9. The ink jettable and UV-curable composition of claim 1, further comprising a nonionic surfactant.

10. The ink jettable and UV-curable composition of claim 1, further comprising a water-soluble or water-dispersible polyurethane.

11. The ink jettable and UV-curable composition of claim 1 having a viscosity of less than 3 centipoise as measured at 25° C.

12. The ink jettable and UV-curable composition of claim 1, further comprising a photosensitizer.

13. The ink jettable and UV-curable composition of claim 5 further comprising a pigment colorant that has a median particle diameter of less than 150 nm, in an amount of at least 0.1 weight % and up to and including 30 weight %, based on the total weight of the ink jettable and UV-curable composition.

14. The ink jettable and UV-curable composition of claim 1 that comprises a complex of reducible silver ions or silver nanoparticles with the reactive polymer.

15. The ink jettable and UV-curable composition of claim 1, comprising a complex of silver nanoparticles with the reactive polymer, wherein the silver nanoparticles have an average diameter of at least 2 nm and up to and including 500 nm.

16. The ink jettable and UV-curable composition of claim 1, comprising a complex of silver nanoparticles with the reactive polymer, wherein the silver nanoparticles have an aspect ratio of less than 2.

17. The ink jettable and UV-curable composition of claim 1, comprising a complex of silver nanoparticles with the reactive polymer, wherein the silver nanoparticles have an aspect ratio of greater than or equal to 2.

18. The ink jettable and UV-curable composition of claim 1 that comprises a complex of reducible palladium ions or palladium nanoparticles with the reactive polymer.

19. The ink jettable and UV-curable composition of claim 1 that comprises a complex of reducible metal ions or metal nanoparticles with the reactive polymer.

* * * * *